(12) United States Patent
Martin et al.

(10) Patent No.: US 7,465,410 B2
(45) Date of Patent: *Dec. 16, 2008

(54) SOLVENT-ACTIVATED REACTOR

(75) Inventors: Perry L. Martin, Yuba City, CA (US);
Roy W. Martin, Downers Grove, IL (US)

(73) Assignee: Truox, Inc., McClellan, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/060,890

(22) Filed: Feb. 18, 2005

(65) Prior Publication Data

US 2006/0013751 A1    Jan. 19, 2006

Related U.S. Application Data

(63) Continuation-in-part of application No. 10/934,801, filed on Sep. 3, 2004.

(60) Provisional application No. 60/588,442, filed on Jul. 16, 2004.

(51) Int. Cl.
*C01B 11/02* (2006.01)
*C01B 11/10* (2006.01)
*C02F 1/76* (2006.01)
*A62D 9/00* (2006.01)
*B01J 19/00* (2006.01)

(52) U.S. Cl. .............................. 252/186.25; 252/186.2; 252/186.21; 252/186.27; 252/186.34; 252/186.35; 252/187.21; 252/187.23; 252/187.33; 252/187.34; 252/183.11; 252/183.12; 252/183.13; 252/183.14; 422/241; 210/754; 210/756

(58) Field of Classification Search ............ 252/187.21, 252/186.25

See application file for complete search history.

(56) References Cited

U.S. PATENT DOCUMENTS

| | | | |
|---|---|---|---|
| 3,951,838 A | 4/1976 | Jayawant et al. | 252/99 |
| 4,064,062 A | 12/1977 | Yurko | 252/99 |
| 4,105,827 A | 8/1978 | Brichard et al. | 428/403 |
| 4,117,087 A | 9/1978 | Dillenburg et al. | 423/275 |
| 4,126,717 A | 11/1978 | Mazzola | 427/220 |
| 4,178,351 A | 12/1979 | Klebe et al. | 423/275 |
| 4,321,302 A | 3/1982 | Umeki et al. | 428/404 |
| 4,421,669 A | 12/1983 | Brichard | 252/186.25 |
| 4,482,471 A | 11/1984 | Allen et al. | 252/186.31 |
| 4,526,698 A | 7/1985 | Kuroda et al. | 252/99 |
| 4,759,956 A | 7/1988 | Amer et al. | 427/213 |
| 5,002,679 A | 3/1991 | Tai | 252/90 |

(Continued)

FOREIGN PATENT DOCUMENTS

CA   2323780   4/2001

(Continued)

*Primary Examiner*—Joseph D Anthony

(57) ABSTRACT

A reactor for an in-situ production of a chemical product in high yield are presented. The reactor, which may be placed in a main solvent, includes a core and a reactor wall around the core. The reactor wall allows controlled permeation of the main solvent to the core. The core contains a reactant that reacts to produce a target product upon being contacted by a main solvent. The target product leaves the reactor at a controlled rate. Because the amount of the main solvent that permeates into the reactor is controlled, a high concentration of the reactant is maintained inside the reactor, resulting in a higher yield of the desired chemical product than if the reactants were directly added to the body of main solvent.

52 Claims, 15 Drawing Sheets

U.S. PATENT DOCUMENTS

| | | | |
|---|---|---|---|
| 5,194,176 A | 3/1993 | Copenhafer et al. | 252/186.27 |
| 5,403,549 A * | 4/1995 | McNeil et al. | 422/29 |
| 5,437,686 A * | 8/1995 | Heffner et al. | 8/111 |
| 5,502,183 A * | 3/1996 | Andrews et al. | 540/46 |
| 5,525,121 A * | 6/1996 | Heffner et al. | 8/111 |
| 5,755,993 A * | 5/1998 | Heffner et al. | 252/186.39 |
| 5,888,528 A * | 3/1999 | Wellinghoff et al. | 424/405 |
| 5,936,106 A | 8/1999 | Asher et al. | 554/98 |
| 5,965,264 A | 10/1999 | Barenberg et al. | 428/402 |
| 6,221,826 B1 | 4/2001 | Surutzidis et al. | 510/349 |
| 6,277,408 B1 | 8/2001 | Wellinghoff et al. | 424/473 |
| 6,384,006 B1 | 5/2002 | Wei et al. | 510/376 |
| 6,409,976 B1 | 6/2002 | Poschmann et al. | 422/199 |
| 6,432,322 B1 | 8/2002 | Speronello et al. | 252/187.23 |
| 6,583,058 B1 | 6/2003 | Rajendran et al. | |
| 6,605,304 B1 | 8/2003 | Wellinghoff et al. | 424/489 |
| 6,676,850 B2 | 1/2004 | Speronello et al. | 252/187.21 |
| 6,699,404 B2 | 3/2004 | Speronello et al. | 252/187.23 |
| 6,727,219 B2 | 4/2004 | Buckland et al. | 510/439 |
| 6,824,756 B2 | 11/2004 | Rosenblatt et al. | 423/472 |
| 2001/0012504 A1 | 8/2001 | Thangaraj et al. | 423/477 |
| 2003/0080317 A1* | 5/2003 | Speronello et al. | 252/175 |
| 2003/0180384 A1* | 9/2003 | Koermer et al. | 424/661 |

FOREIGN PATENT DOCUMENTS

| | | |
|---|---|---|
| JP | 2002045637 A | 2/2002 |

* cited by examiner

Coating Dissolves or Dissipates

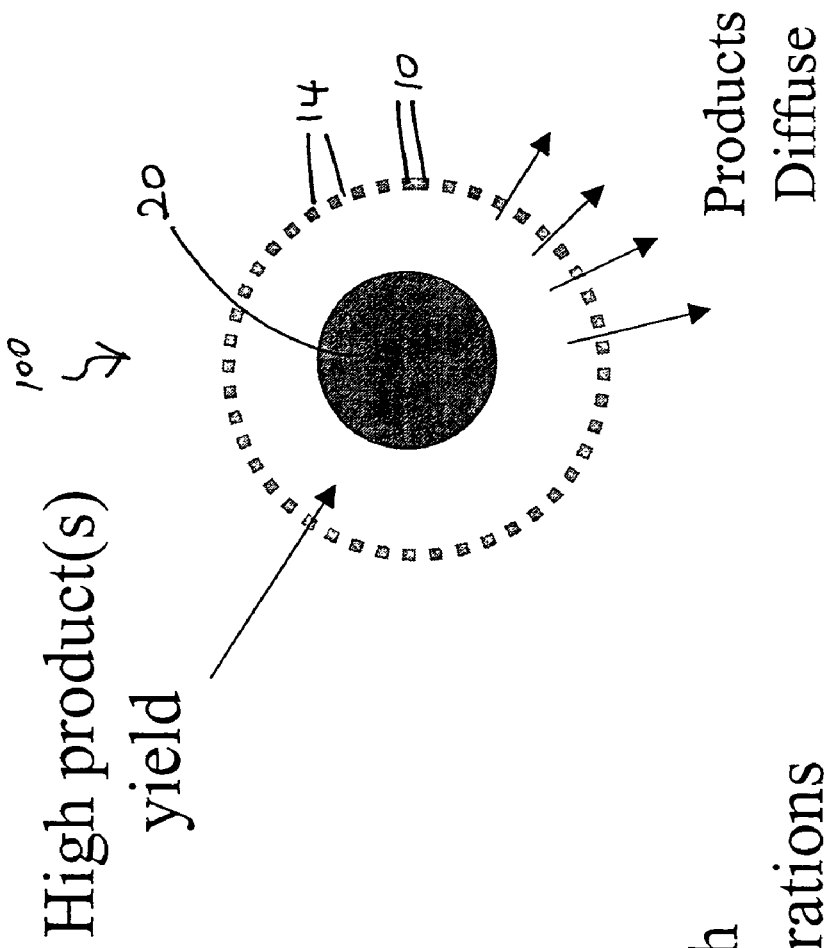
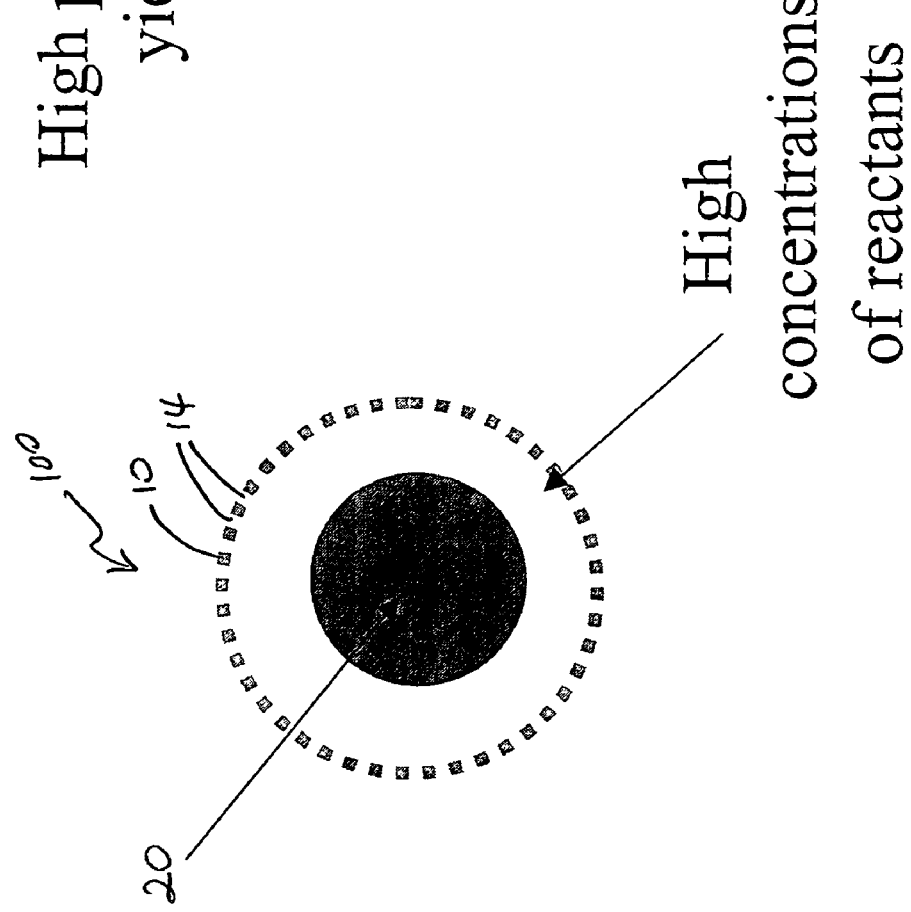

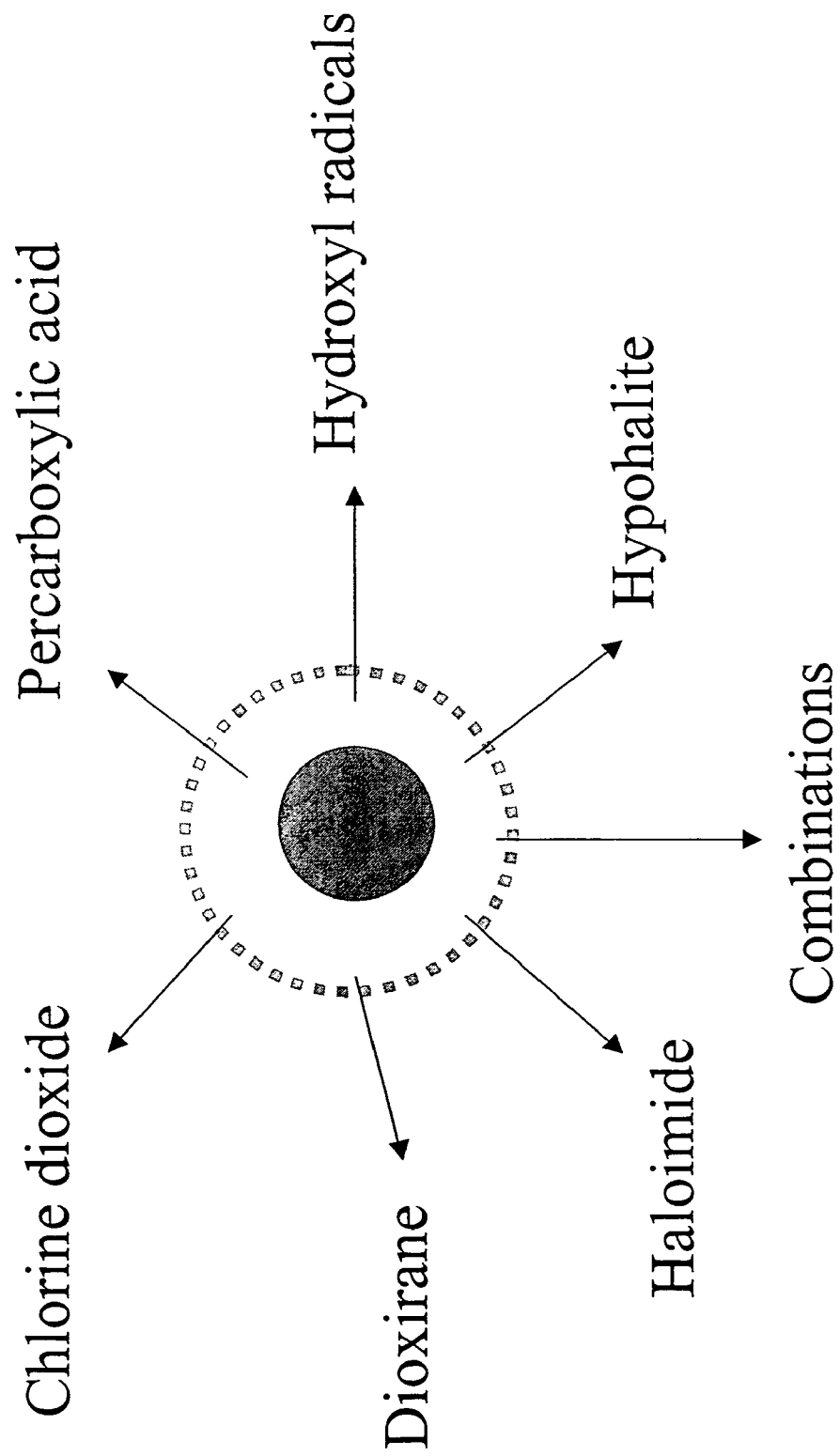

Low pH Acetate Conversion

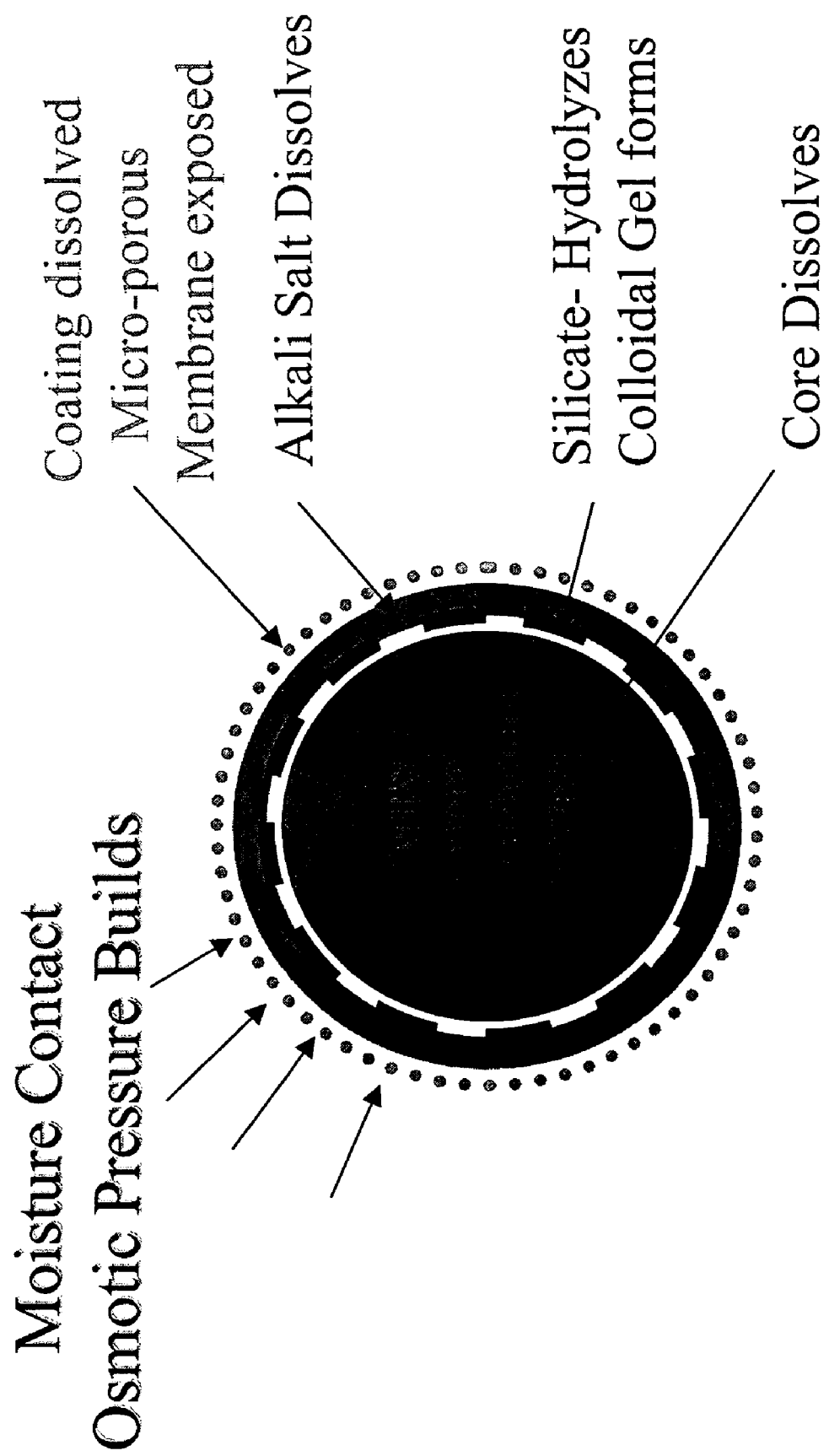
4B

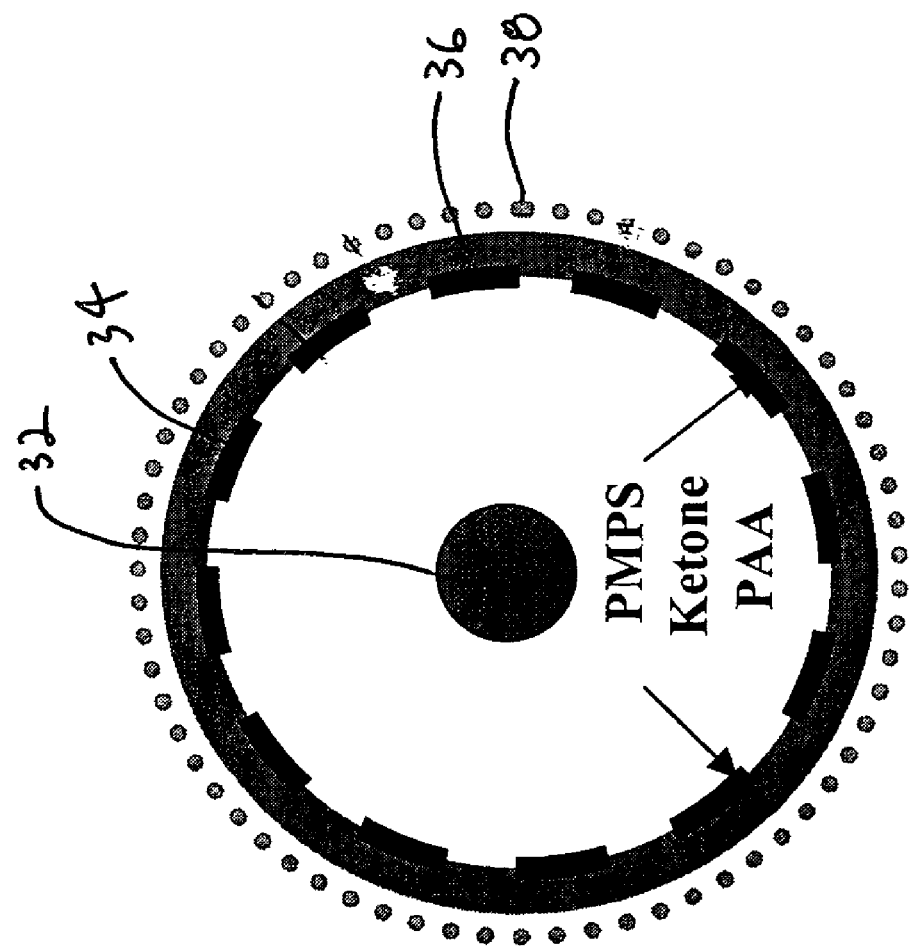
4C

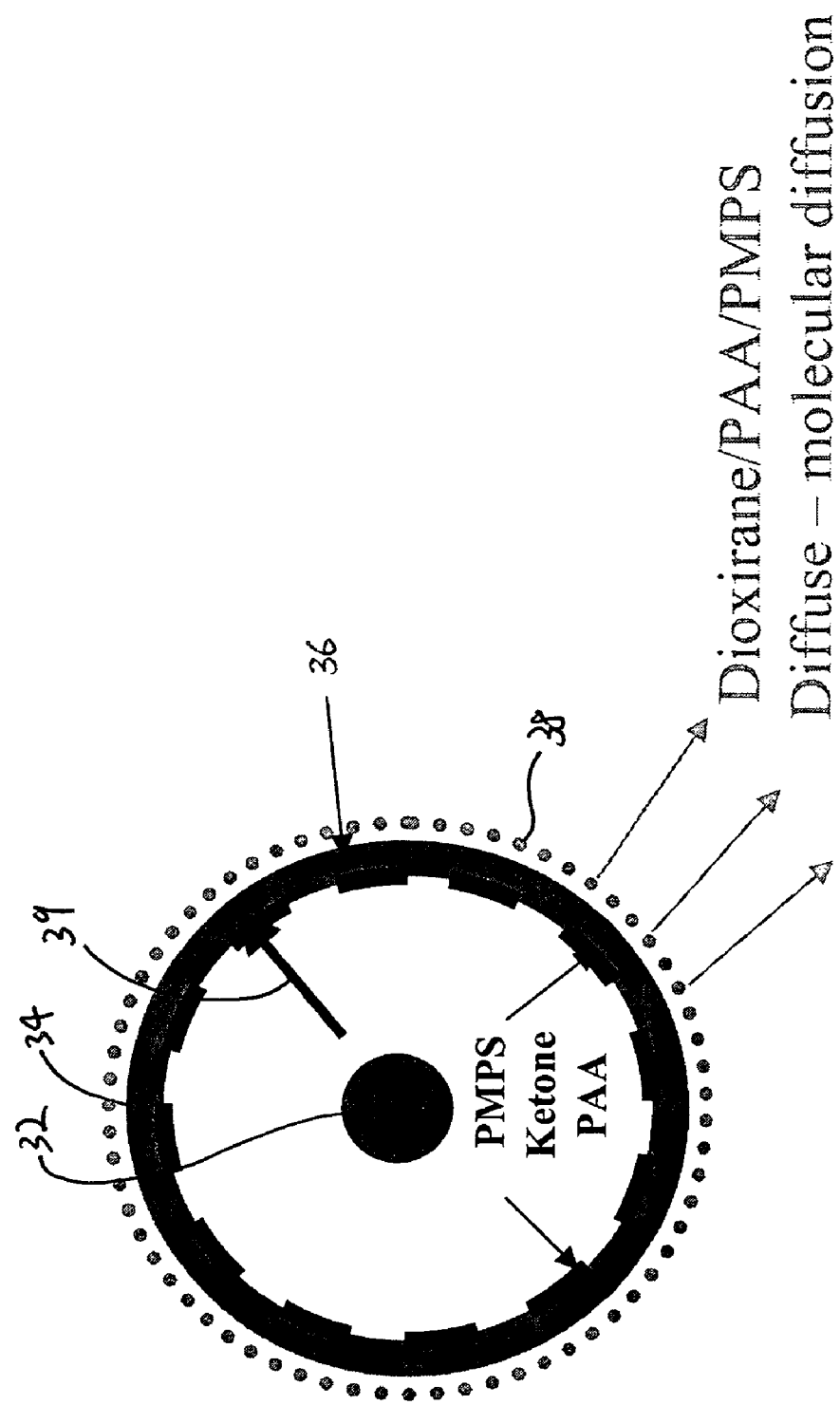

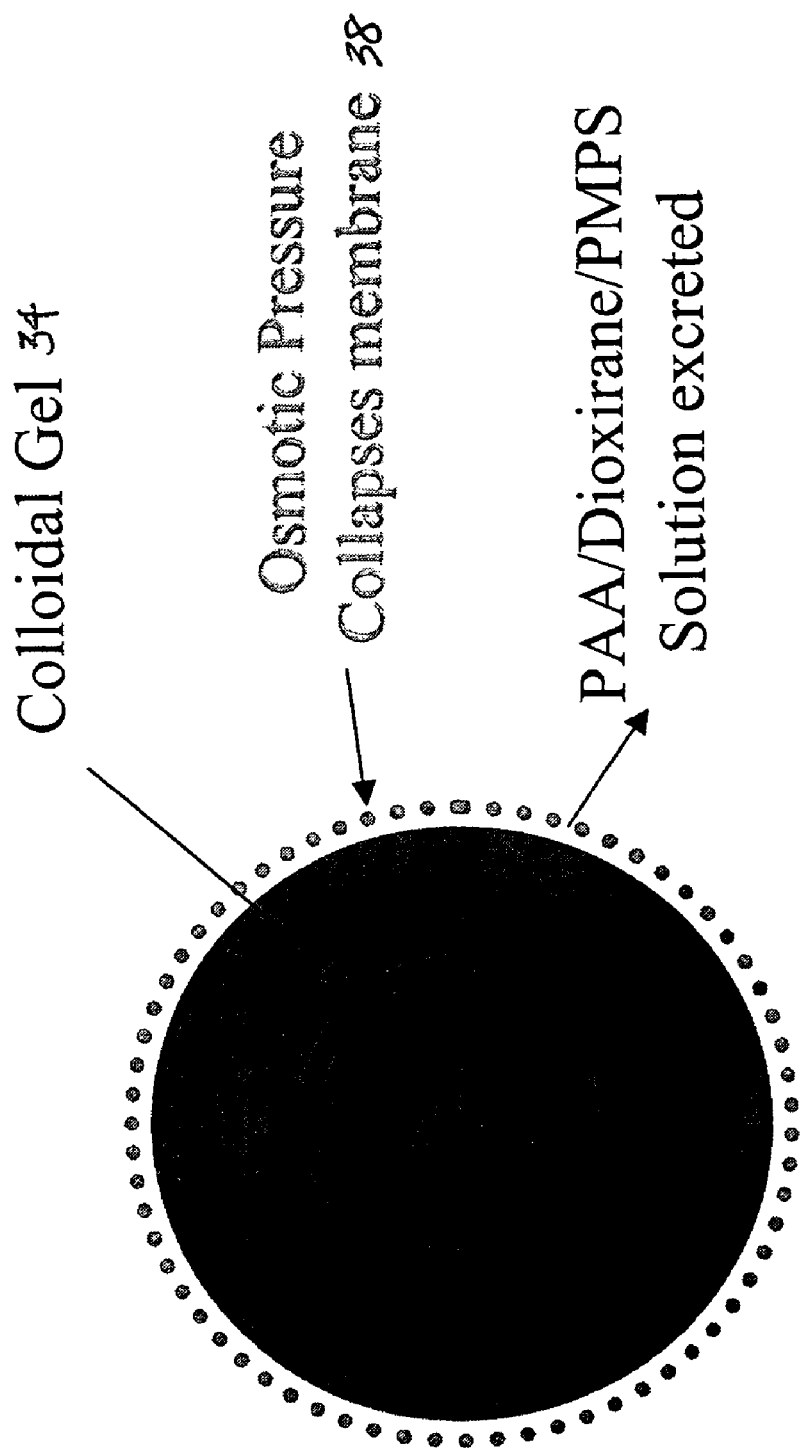

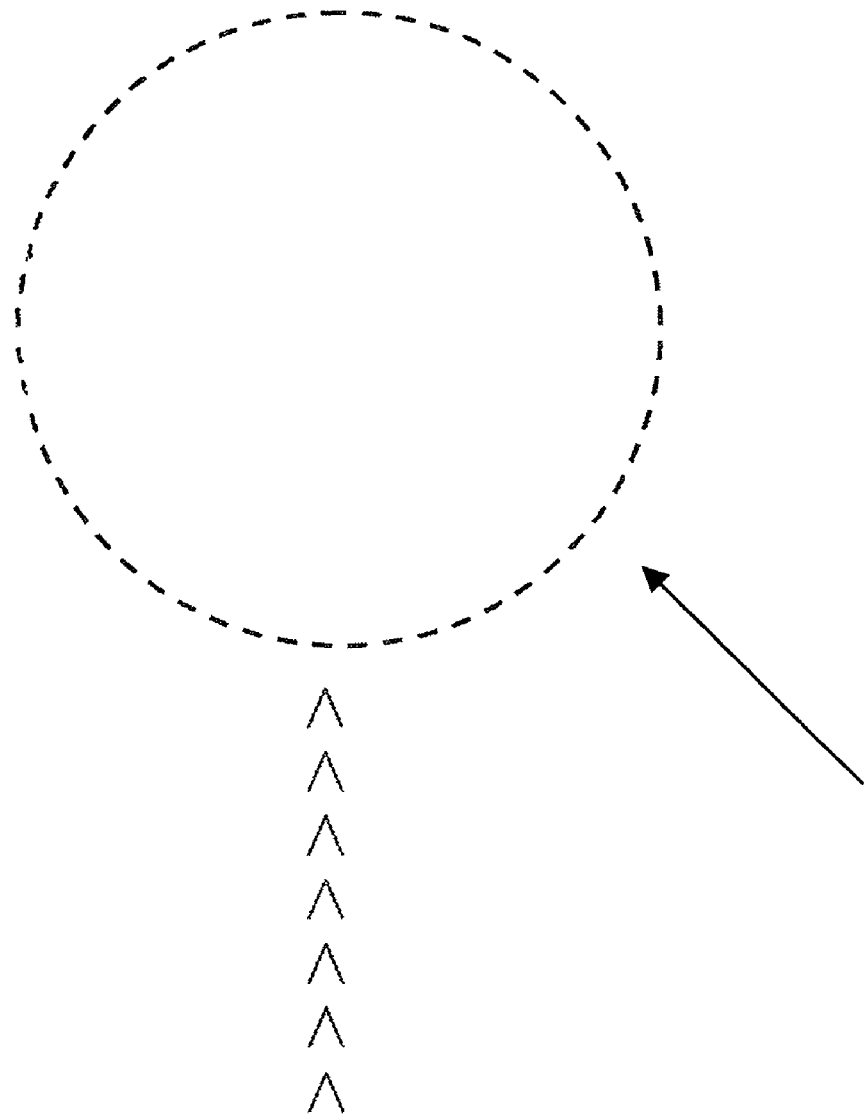
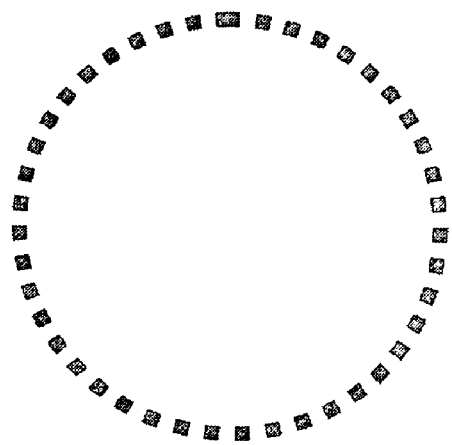
4F

SOLVENT-ACTIVATED REACTOR

RELATED APPLICATIONS

This patent application is a Continuation-in-Part application of U.S. patent application Ser. No. 10/934,801 filed on Sep. 3, 2004, which in turn claims the benefit of U.S. Provisional Application Ser. No. 60/588,442 filed on Jul. 16, 2004 under 35 U.S.C. § 119(e). This application claims the benefit of both of the above patent applications and incorporates by reference the contents of both applications.

FIELD OF INVENTION

This invention relates generally to an oxidizing compound and more particularly to an oxidizing compound that is stabilized for storage.

BACKGROUND

Oxidizers are commonly used to effectively destroy organic and inorganic contaminants. Some of the typical applications of oxidizers include treatment of water systems and inactivation of bacteria and viruses in various media.

Although oxidizers are used in numerous applications, there are also applications where they are not used even though their utility is well established. The reason these oxidizers are not used often relates to their instability during storage. Oxidizers such as hypochlorous acid and peracids, for example, could be used in more applications than the disinfection applications that they are already used in if their stability can be improved. The problem with some of these powerful oxidizers such as hypochlorous acid and peracids is that their activity level tends to decrease during storage. Since the effectiveness of the oxidizers in various applications depends on their concentrations, activity levels, and the level of demand on the oxidizer as measured by its oxidation reduction potential (ORP), a reduction in the activity level of the oxidizers impedes their performance in the various applications. Thus, even if an oxidizer is initially highly effective, the effectiveness decreases during storage.

A few methods are currently used to get around this storage problem. One of these methods, which is the point-of-use generation method or the in-situ method, is desirable because it eliminates the need for prolonged storage. However, on a practical level, these point-of-use generation methods are not widely employed because they require expensive equipment and specialized expertise. Other in-situ generation methods involve adding the reagents to the water to produce the target product. However, when doing this, significant dilution of reagents as well as competing reactions impede the level of conversion to the target product.

Sometimes, the reagents are coated to provide a barrier between the reagents and the environmental elements, thereby making the reagents easier to store and use in formulations. The coatings are designed so that when they are combined with water, they dissolve and rapidly release the reagents. Silicates, for example, are widely used in laundry detergent applications. In the alkaline condition induced by the laundry formulation, the silicate coating rapidly dissociates and releases the encased additives into the bulk water. There are also instances where a highly hydrophobic coating such as a wax or slow-dissolving coating is used for time-release purposes. These cases operate on the basis of a mechanism similar to the mechanism of the silicate coating in that the outer coating material quickly dissolves to expose the enclosed material to the solvent in the environment, at which point chemical reaction starts.

Various bleaching and oxidizing compositions have been made to enhance the performance in an application. Such enhancement is desirable because the generally effective hydrogen peroxide donors such as percarbonate, perborate, and persulfate-based additives do not remove stubborn stains from clothing. To enhance their bleaching ability under the conditions that are typical to the application (e.g., laundry water), precursors are added to induce formation of a more effective bleaching agents (e.g., tetraacetyl-ethylenediamine (TAED)) in-situ. However, this addition of bleaching agent precursors has its disadvantages. For example, high concentrations of additives are needed to achieve effective results, increasing both the cost and inconvenience.

Another way of enhancing peroxygen compounds' performance is to make them more stable, thus allowing long-term storage. Sometimes, the peroxygen compounds and the formulations they are used in are coated to enhance storage stability. These coatings, however, do not always dissolve quickly and therefore increase the time it takes for the peroxygen compound to become effective. One of the ways to allow long-term storage of oxidizers such as potassium monopersulfate and chlorine is to store them in packages or bags. The packages or bags are designed to dissolve in water, so that they can be directly thrown into a body of water. Although the use of bags provides for easy application in large scale or macro applications, their utility is limited in that they can be used only for applications of a certain scale.

A method of stabilizing reactive components for storage without compromising or limiting their performance during usage is desired.

SUMMARY

In one aspect, the invention is a solvent-activated reactor that generates a target product when placed in contact with a main solvent. The reactor includes a core and solvent-permeable reactor wall defining a reactor space that contains the core. The core contains an intermixed first reactant and second reactant that are capable of at least partially dissolving in a main solvent to form liquid phase reactants that generate the target product by a chemical reaction upon being contacted by the main solvent. The solvent-permeable reactor wall allows the main solvent into the reactor space when the reactor is placed in contact with the main solvent, and wherein the target product diffuses out of the reactor space at a restricted rate through the reactor wall.

The invention also includes an agglomerate composition including a plurality of the above solvent-activated reactors, and a method of producing such agglomerate composition. The method entails combining the plurality of solvent-activated reactors, and applying a pressure between about 1,000 psig and about 10,000 psig to agglomerate the plurality of solvent-activated reactors into the agglomerate composition. The solvent-activated reactors generate a target product in-situ upon being contacted by a predetermined main solvent.

In another aspect, the invention is a solvent-activated chlorine dioxide generator including a core and a reactor wall forming a reactor space that contains the core. The core contains a mixture of metal chlorite, an acid source, and a free halogen source that dissolve to form liquid phase reactants and generate chlorine dioxide through an in-situ chemical reaction when contacted by a main solvent. The reactor wall allows the main solvent to permeate through it and activate the metal chlorite, the acid source, and the free halogen source to generate chlorine dioxide. The reactor wall releases the chlorine dioxide and a free halogen in the form of an oxidizing solution when the chemical reaction progresses to a critical level.

The chlorine dioxide generator may be made such that the core includes a mixture of metal chlorite and an acid source without a free halogen source. The a solvent-permeable coating releases the chlorine dioxide into a surrounding environment when a chlorine dioxide concentration reaches a critical level.

In yet another aspect, the invention is a solvent-activated reactor for generating a target product whose core contains a dry aggregate of first reactant and second reactant wherein the first reactant and the second reactant are in direct contact with each other. The core is capable of generating the target product by a chemical reaction upon being contacted by the main solvent.

The reactor wall of the solvent-activated reactor may be made to disintegrate after the reactor space is substantially depleted of the reactant and the target product. In some cases, the reactor wall is soluble in the main solvent.

BRIEF DESCRIPTION OF THE DRAWINGS

FIGS. 2A, 2B, 2C, and 2D show different stages of a reactor undergoing a reaction.

FIG. 3 is a schematic illustration that the reactor of the invention may be used to form various target products.

FIGS. 4A, 4B, 4C, 4D, 4E, and 4F show a micro-reactor for generation of multiple target products under acid catalyzed conditions.

DETAILED DESCRIPTION OF THE PREFERRED EMBODIMENT(S)

Figure 1A:
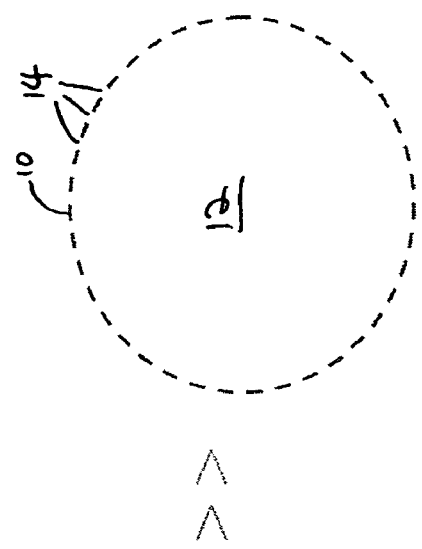
FIGS. 1A, 1B, and 1C are schematic illustrations of the reactor wall during a reaction.

The invention is particularly applicable to generation and release of oxidizers that have bleaching, biocidal, or virucidal properties and it is in this context that the invention will be described. It will be appreciated, however, that the reactor, the method of making the reactor, and the method of using the reactor in accordance with the invention has greater utility and may be used for any other target product(s). Although the main solvent is described as water for clarity of illustration, the invention is not so limited.

"Reactor space" is a space that is defined by the outline of a reactor, and includes the space surrounded by the reactor wall, the reactor wall itself, and any pores or channels in the reactor wall. A "main solvent," which is described as water in this disclosure although it is not so limited, may be any solvent that dissolves the reactant(s) in the core. A substance that is released at a "controlled rate" is not released all at once but gradually over a period of time.

A "non-solvent" is a carrier and void producing volatile liquid in which the polymer or coating material used in forming the reactor wall is insoluble. The term is also used to describe a liquid in which the oxidizer and/or oxidizable substance is insoluble. A solvent and a non-solvent that are used together are miscible. "Amphipathic" is intended to mean that a molecule has a polar and a nonpolar domain. A "polymer," as used herein, includes a copolymer.

A "critical level" indicates that a predetermined amount of the target product is generated by the chemical reaction in the reactor. The critical level may be, but does not have to be, defined by the pH level inside the reactor, the concentration of reactants inside the reactor, or the concentration of the target product inside the reactor and the exact level varies depending on the types of reactants, the generated product, the reactor wall composition, outside environment, etc. When the reactor wall "disintegrates," it could collapse due to a pressure difference between the inside and the outside of the reactor, dissolve in the main solvent, or come apart and dissipate due to forces applied by the movement in the main solvent. A membrane is a solid porous material. A plasticizer is a compound that alters the pliability and/or the hygroscopicity of the polymer. A "surrogate" describes the various acid, salt, and derivative forms of a particular compound. "Water," as used herein, is not limited to pure water but can be an aqueous solution.

To maximize the yield in a chemical reaction, it is usually preferable to start with high concentrations of reactants because the molar concentrations of the reactants determine the rate of reaction and the subsequent product yield. Therefore, adding reactants to a large body of water to be treated is not an effective way to generate the desired product in-situ. Adding the reactants to the water lowers the reactant concentrations, and the resulting conversion of the reactants to the desired product(s) is generally poor. Another factor to be considered is the side reactions. When generating an agent in-situ, the oxidizer reactant is often consumed in reactions other than those desired for the in-situ production of the target product. Therefore, adding the reactants to the water to be treated results in more reagent requirements, longer reaction time, and/or an overall decreased yield of the target product.

Furthermore, the chemical environment, such as pH, can adversely affect the in-situ production of the target product. For example, reactions that are acid catalyzed are not supported in alkaline conditions such as laundry wash water. By isolating the reactants and controlling the conditions inside the reactor, efficient generation of the target product(s) occurs regardless of the conditions external to the reactor.

When an oxidizer, such as potassium monopersulfate (PMPS), is added to water to convert sodium chloride to hypochlorous acid through a hypohalite reaction, the conversion or yield is dependent on the molar concentrations of the reactants. As described above, however, adding a given amount of reactants to a large volume of water yields poor conversion to the target product. Furthermore, potassium monopersulfate is highly reactive with organic chemical oxygen demand (COD). Thus, upon being exposed to the bulk solution, the PMPS reacts with the COD and further reduces the concentration of PMPS that is available to induce the hypohalite reaction.

The invention is based on the concept that a high yield can be maintained by controlling the rate at which the reactants are exposed to water. More specifically, if the reactants were first exposed to a small volume of water and allowed to react to generate the target product, a high yield of the target product can be obtained because the reactant concentrations will be high. Then, the target product can be exposed to a larger volume of water without compromising the yield. The rate at which the reactants are exposed to water has to be such that the target product is generated in high-yield before more water dilutes the reactants. The invention controls the reactants' exposure to water by coating the reactants with a material that allows water to seep in and reach the reactants at a controlled rate.

Depending on the embodiment, the invention may be a reactor that is stable enough for storage and useful for generating high yields of products in-situ, product including oxidizers, biocides, and/or virucidal agents. A "soluble reactor" has walls that dissolve in the main solvent after the reaction has progressed beyond a certain point such that the concentration of the target product is equal to or greater than a predetermined critical level. The soluble reactor is stable when dry. When mixed with a main solvent (e.g., water), however, the coating material that forms the outer wall of the soluble reactor allows the solvent to slowly seep into the inside of the reactor and react with the core. The core of the soluble reactor contains one or more reactants that, when combined with the main solvent, react to generate a target product. Since the concentrations of the reactants are high within the soluble reactor, a high yield of the target product is achieved inside the reactor. After the generated amount of the target product reaches a critical level, the coating material dissolves or dissipates, releasing the target product into the bulk solvent body.

In some embodiments, the reactor of the invention is a "micro-reactor" having a diameter or width in the range of 10-2000 μm. However, the reactor is not limited to any size range. For example, the reactor may be large enough to be referred to as a pouch. A single reactor may be both a micro-reactor and a soluble reactor at the same time. Furthermore, a reactor may have a soluble wall and a non-soluble wall.

The reactor of the invention includes a core and a reactor wall surrounding the core. There may be additional layers, such as a protective layer for shielding the core from the environmental elements. The core contains an oxidizer reactant, an oxidizable reactant, or both. The reactor wall has a lower solubility than the reactants in the core or the target product that is produced in the reactor. The reactor wall controls the diffusion of water into the reactor and restricts the diffusion of reaction components out of the reactor. The rate at which water seeps into the reactor and the rate at which the target product leaves the reactor are controlled through the porosity of the reactor wall.

The invention includes a method of preparing a reactor, wherein the reactor produces high concentrations of one or more target products that are different from the reactants enclosed in the reactor. The method of the invention allows the production of compositions that are stable for storage and, upon activation by contact with the solvent, produce a different composition in a high yield. It is the intent of the disclosure to illustrate exemplary methods of use for the various compositions.

Figure 1B:
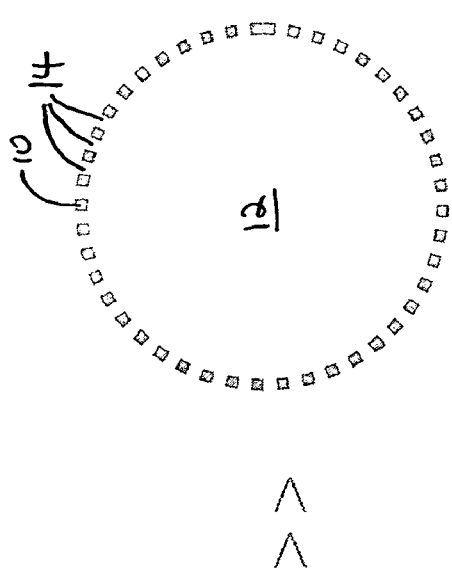
Figure 1C:
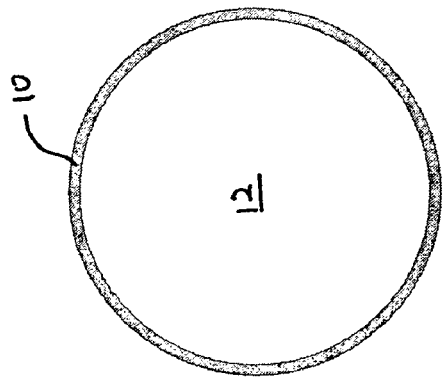

FIGS. 1A, 1B, and 1C are schematic illustrations of the reactor wall 10 of a reactor 100 during a reaction. As shown in FIG. 1A, the reactor wall 10 is initially substantially solid, forming a reactor space 12 where reactants (not shown) can be placed. When the reactor wall 10 encounters water, it slowly forms cracks or fissures 14 in the reactor wall 10, as shown in FIG. 1B. The water seeps into the reactor 100 through the fissures 14, dissolves at least some of the reactants in the reactor space 12, and triggers a chemical reaction. Aside from the fissures 14, the reactor wall 10 remains substantially intact while the reactants react inside the reactor space 12 to generate the target product, thereby providing a reaction space that is substantially sheltered from the environment surrounding the reactor 100. However, once the reaction progresses to a critical level, the reactor wall 10 disintegrates, as illustrated in FIG. 1C by the thinning of the reactor wall 10. The reactor wall 10 eventually dissipates into the water, releasing the target product into the body of water.

Details about the composition of the reactor wall 10 are provided below.

One way to control the timing of the disintegration of the reactor wall is to select a reactor wall 10 whose solubility is a function of pH. In this case, the critical level is a certain pH level where the reactor wall 10 becomes soluble. If the solubility of the reactor wall 10 is impaired by the pH of the internal and/or the external solution, and the pH of the internal solution changes as the reaction in the reactor space 12 progresses, the reactor wall 10 will not become soluble until a certain pH is reached in the reactor (i.e., the reaction has progressed to a certain point). The reactions may occur in the reactor space 12 or along the inner surfaces of the reactor wall 10.

Figure 2B:
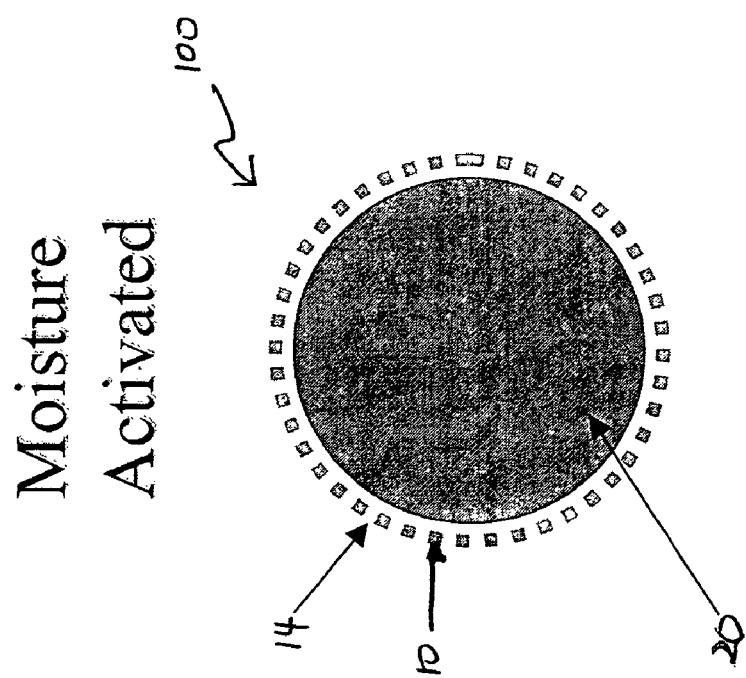
Figure 2A:
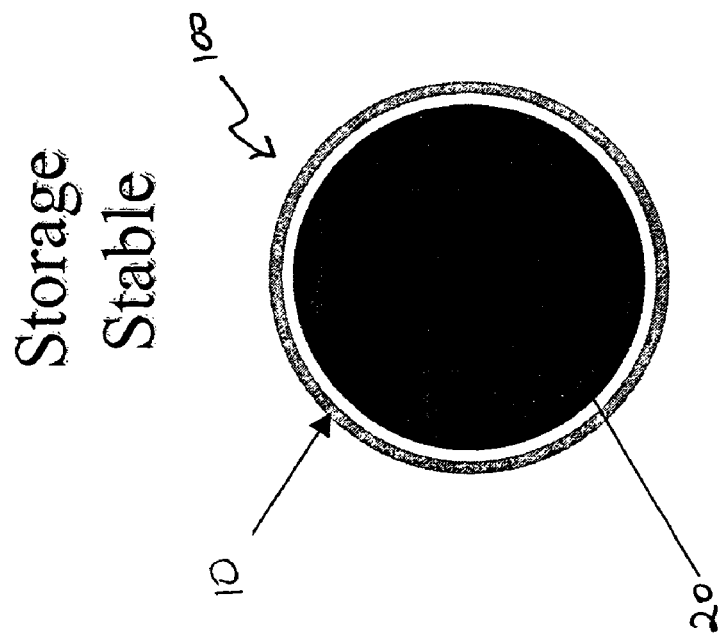

FIGS. 2A, 2B, 2C, and 2D show different stages of the reactor 100 undergoing a reaction. The reactor 100 has a core 20 in the reactor space 12. When in storage, the reactor wall 10 is intact and protects the core 20 from various environmental elements, as shown in FIG. 2A. When the reactor 100 is placed in the liquid to be treated, the reactor wall 10 begins to form the fissures 14 and the core 20 begins to dissolve, as shown in FIG. 2B. When dissolved to form a liquid phase, the components that form the core 20 become reactive and a chemical reaction begins. Since the amount of the water that permeates into the reactor space 12 is small, the components that form the core 20 (i.e., the reactants) remain high in concentration. As the chemical reaction progresses, the reactant concentration decreases, as shown by the decreasing size of the core 20 in FIG. 2C. When the concentration of the desired target product becomes high, the reactor wall 10 begins to disintegrate and the target product diffuses out of the reactor wall 10 into the water outside the reactor, as shown in FIG. 2D. The total in-situ production of the target product occurs in less than about 8 hours, preferably in less than about 2 hours and most preferably in less than about 1 hour.

The reactant in the core may contain an oxidizing agent, such as a peroxygen compound. The peroxygen compound may be, for example, monopersulfate, percarbonate, perborate, peroxyphthalate, sodium peroxide, calcium peroxide, magnesium peroxide, or urea peroxide. The oxidizing agent may also include a free halogen such as dichloroisocyanuric acid, a salt of dichloroisocynuric acid, a hydrated salt of dichloroisocyanuric acid, trichlorocyanuric acid, a salt of hypochlorous acid, bromochlorodimethylhydantoin and dibromodimethylhydantoin.

As for the "oxidizable reactant," which may also be present in the core, it usually reacts with the oxidizer reactant to produce one or more target products. The target products may include an oxidizer that is different from the oxidizer reactant. In some embodiments, the oxidizable reactant is a catalyst that is not consumed during its reaction with the oxidizer reactant. However, in some other embodiments, the oxidizable reactant is altered and consumed by the reaction with the oxidizer reactant.

FIG. 3 is a schematic illustration that the reactor 100 may be used with any suitable reactions including but not limited to reactions that produce hypohalite, halo-amide, dioxirane, hydroxyl radicals, percarboxylic acids, or chlorine dioxide. The reactor is useful for producing one or more of hypochlorous acid, hypochlorite, chlorine gas, hypobromous acid, hypobromite, bromine gas, N-halo-succinimide, N-halo-sulfamate, N-bromo-sulfamate, dichloro-isocyanuric acid, trichloro-isocyanuric acid, 5,5 dihalo dialkyl hydantoin, Hydroxyl radicals, oxygen radicals, peracids, and chlorine dioxide, and releasing the product into a body of water.

Reactor Core

1) Reactants

Reactants are selected to induce the formation of the desired product(s). When determining the ratio of reactants, consideration should be given to the desired ratio of products. Single species generation of agent is achieved with proper optimization of reagent ratios.

High conversion of reactants and good stability of products are achieved by adding stabilizers and/or pH buffering agents to the mixture of reactants. For example, to produce N-haloimides such as N-chlorosuccinimide, N-succinimide is added to a mixture containing PMPS and NaCl. Also, an organic acid (e.g., succinic acid) and/or inorganic acids (e.g., monosodium phosphate) may be applied to ensure that the pH of the reactant solution is within the desired range for maximum conversion to the haloimide.

The core includes reactants that, upon dissolution, induce the in-situ generation of the desired target product(s). For example, where the desired target product is a bleaching/oxidation agent, the reactant may be a peroxygen compound such as a persulfate, inorganic peroxide, alkyl peroxide, and aryl peroxide, or a free halogen such as dichloroisocyanuric acid, a salt of dichloroisocyanuric acid, a hydrated salt of dichloroisocyanuric acid, trichlorocyanuric acid, a salt of hypochlorous acid, bromochlorodimethylhydantoin and dibromodimethylhydantoin. The core can be formed into any useful size and shape, including but not limited to a granule, nugget, wafer, disc, briquette, or puck. While the reactor is generally small in size (which is why it is also referred to as the micro-reactor), it is not limited to any size range.

Some references such as U.S. Pat. No. 6,605,304 disclose embedding the oxidizable reactant (e.g., a chlorite) in an inert material such as amorphous or crystalline silicate to avoid the oxidizable reactants from contacting one another. For example, in the case where the oxidizable reactant is a chlorite and the target product is chlorine dioxide, not letting the chlorite anions touch one another avoids the formation of chlorate and chloride anions at high temperatures that reduces the chlorine dioxide generation. In the reactor 100, such inert material is not necessary because the methods of production disclosed herein does not involve application of the high processing temperatures. Also, because the reactants needed to produce the oxidant are combined in the core, the reactor 100 eliminates the need for a conduit that functions as a means of combining the reactants in chlorine dioxide generators such as the one described in U.S. Pat. No. 6,605,304. In the reactor 100, different types of reactants in the core dissolve substantially simultaneously as they are contacted by water and react freely as liquid phase reactants in the space that is defined by the reactor wall.

2) Binders

Binders are compounds that are used to combine the components in the core and hold them together, at least until they are coated, to provide a homogeneous mixture of reactants throughout the core. Binders may not be necessary in some embodiments. Many different types of compounds can be used as binders including polymers with hydrophobic and/or hydrophilic properties (e.g. polyoxyethylene alcohol, fatty acid esters, polyvinyl alcohol,), fatty acids (e.g. myristic acid), alcohols (myristic alcohol), and polysaccharides such as chitosan, chitin, hydroxypropyl cellulose, hydroxypropyl methylcellulose and the like. The function of the binder is to provide an agglomerating effect without adding an undesirable amount of moisture so as to cause the reactants to dissociate and start reacting. In cases where solvent recovery apparatus is available during manufacturing, binder solvents can be used to promote better distribution of the binder as long as the solubility of the reactants in the binder solvent is low. Binders may constitute about 0.1-20 wt. % of the solvent-activated reactor.

Depending on the application and the other components that are involved, silicate, silica, clay minerals, zeolite, silicon dioxide, fumed silica, silicon oxyhydroxides, aluminum oxide, alumina gel, aluminum oxyhydroxides, aluminates, aluminum sulfate, polyaluminum chloride, metal oxides, metal oxyhydroxides, mineral salts, cross-linking agents, polysaccharides, or polymers may be used as the binder material.

The binder may be a rheology-altering polymer/copolymer such as Carbopol® sold by BFGoodrich that is a family of polymer/copolymers comprised of high molecular weight homo- and copolymers of acrylic acid crosslinked with a polyalkenyl polyether. Rheology-altering polymers allow a wide range of core components to be combined by incorporating a non-solvent in the core. Either the oxidizer reactant or the oxidizable reactant is insoluble in the non-solvent. The presence of the non-solvent prevents activation of the components in the core, whereby the rheology-altering component binds the core components to provide a homogenous mixture. Depending on the embodiment, the non-solvent may become a part of the final composition, be partially removed, or be removed altogether. Since the non-solvent is usually not water, the final product may contain volatiles although it is substantially free of water (moisture). Sometimes, moisture may be used to enhance the formation of the agglomerate. However, in such cases, at least the oxidizer reactant should be coated to prevent its dissociation, the moisture should be well-distributed and used sparingly, and any moisture should be completely removed before long-term storage.

3) Fillers

Fillers can be used or altogether omitted depending on the type of processing and the requirements of the use of the final product. Fillers are typically inorganic compounds such as various metal alkali salts and oxides, zeolites, clays, mineral salts, and the like. The fillers can enhance distribution of moisture when water is employed to enhance agglomeration.

4) pH Buffers

A pH buffer, which is an optional component of the core, provides a source of pH control within the reactor. Even when alkaline water from laundry wash is used to dissolve the core, the pH buffers provide effective adjustment and control of the pH within the desired range to induce the desired reactions inside the reactor. PH buffers can be inorganic (e.g. sodium bisulfate, sodium pyrosulfate, mono-, di-, tri-sodium phosphate, polyphosphates, sodium bicarbonate, sodium carbonate, boric acid, sulfamic acid and the like). Organic buffers are generally organic acids with 1-10 carbons such as succinic acid.

5) Stabilizers

Stabilizers are added when N-hydrogen donors are applied to generate N-haloimides in-situ. Examples of stabilizers include but are not limited to N-succinimide, N-sulfamate, isocyanuric acid, hydantoin, and the like. When stabilization is not required to generate these compounds, they can be omitted.

6) Examples

Where the target product is dioxirane, the oxidizer reactant is one of potassium persulfate, sodium persulfate, ammonium persulfate, potassium monopersulfate, permanganate, and a Caro's acid precursor. The Caro's acid precursor is a combination of a peroxide donor (e.g., urea peroxide, calcium peroxide, magnesium peroxide, sodium peroxide, potassium peroxide, perborate, perphosphate, persilicate, and percarbonate) and a sulfuric acid donor (e.g., sodium bisulfate and pyrosulfate and a sulfuric acid donor). In addition to the oxidizer reactant, the core may also include an organic compound containing carbonyl groups (C=O) to produce dioxirane. Preferably, the organic compound has 3-20 carbons. The core composition may be 10-80 wt. % oxidant and 0.5-50 wt. % carbonyl donor such as aldehydes, ketones, and carboxylic acids. If a binder or a filler is used, each of these components does not make up more than 50 wt. % of the core. If a pH buffer is used, it does not exceed 30 wt. % of the pH buffer. Dioxirane formation is typically most efficient around neutral pH.

Where the target product is a peroxycarboxylic acid (also referred to as percarboxylic acid), it can be produced with a core that includes an oxidizer reactant such as urea peroxide, calcium peroxide, magnesium peroxide, sodium percarbonate, sodium perborate, persulfate(s), monopersulfate, persilicate, perphosphate, sodium peroxide, lithium peroxide, potassium peroxide, or permanganate. The core may also include a carboxylic acid donor such as an ester or acetic acid in the form of an anhydride (e.g., acetic anhydride). Another example is inclusion of tetraacetyl-ethylenediamine (TAED) with the peroxide donor for production of peracid in alkaline conditions. The core composition is about 10-80 wt. % oxidizer reactant and about 1-40 wt. % carboxyl group donor. Optionally, a binder, a filler, and a pH buffer may be added to the core. The core is at least 50 wt. % solids. The molar ratios are optimized and addition of pH buffers is employed in the core composition before coating. Upon dilution with water, the core dissolves and produces a ready source of peracetic acid in high yield.

Where the target product is a hypohalite, the reactant in the core may be potassium persulfate, sodium persulfate, ammonium persulfate, potassium monopersulfate, permanganate, or a Caro's acid precursor. The Caro's acid precursor is a combination of a peroxide donor (urea peroxide, calcium peroxide, magnesium peroxide, sodium peroxide, potassium peroxide, perborate, perphosphate, persilicate, and percarbonate) and a sulfuric acid donor (sodium bisulfate and pyrosulfate). The core is about 10-80 wt. % oxidizer reactant and about 0.5-40 wt. % halogen donor. Optionally, a binder, a filler, and a pH buffer may be added to the core.

Where the target product is an N-halo-amide, the reactant may be a potassium persulfate, sodium persulfate, ammonium persulfate, potassium monopersulfate, permanganate, or a Caro's acid precursor. The core may also include a monovalent metal salt, a divalent metal salt, or a trivalent metal salt, as well as an N-hydrogen donor capable of reacting with hypo-halite to generate the target product and a halogen donor such as a chloride or bromide donor. The composition of the core is about 10-80 wt. % reactant, 0.5-40 wt. % a halogen donor, and 2-50 wt. % stabilizer. Optionally, a binder, a filler, and a pH buffer may be added to the core.

Where the target product is chlorine dioxide, the core composition is about 10-95 wt. % reactant, about 0-20 wt. % halogen donor, and about 0.5-60 wt. % chlorite donor. In one embodiment, the reactant in the core may be potassium persulfate, sodium persulfate, ammonium persulfate, potassium monopersulfate, permanganate, or a Caro's acid precursor. The halogen donor may be, for example, a mono-valent or di-valent metal salt including but not limited to magnesium chloride, calcium chloride, sodium chloride, or potassium chloride. The halogen donor may be part of the chlorite donor, which may be sodium chlorite, potassium chlorite, magnesium chlorite, or calcium chlorite, or various combinations thereof.

In another variation where the product is chlorine dioxide, the core composition is about 10-95 wt. % reactant (e.g., an acid source), about 0.5-40 wt. % free halogen donor, and about 1-50 wt. % metal chlorite. The reactant may be potassium monopersulfate, a metal bisulfate (e.g., sodium bisulfate), a metal pyrosulfate, or a metal phosphate. The free halogen may be selected from at least one of: dichloroisocyanuric acid, a salt of dichloroisocyanuric acid (e.g., a sodium salt thereof), a hydrated salt of dichloroisocyanuric acid, trichlorocyanuric acid, a salt of hypochlorous acid, bromochlorodimethylhydantoin, or dibromodimethylhydantoin may be used as the free halogen donor. A sodium salt of dichloroisocyanuric acid dihydrate may also be used. The chlorite may be a mono- or di-valent chlorite such as sodium or calcium chlorite.

An example of a chlorine dioxide generator contains sodium chlorite, sodium bisulfate, and the sodium salt of dichloroisocyanuric acid dihydrate in the core.

Where the core includes a metal chlorite, an acid source, and a free halogen donor, the chemical reaction that occurs when the main solvent reaches the core generates an oxidizing solution containing chlorine dioxide and free halogen. The concentration of the free halogen in the oxidizing solution is less than ½ of the chlorine dioxide concentration in the oxidizing solution, preferably less than ¼ of the chlorine dioxide concentration in the oxidizing solution, and more preferably less than 1/10 of the chlorine dioxide concentration in the oxidizing solution. The ratio of the chlorine dioxide concentration to the sum of the chlorine dioxide concentration and chlorite anion concentration in such solution is at least 0.25:1, preferably at least 0.6:1, and more preferably at least 0.75:1 by weight. In some embodiments with a high free halogen content, the free halogen concentration in the oxidizing solution may be as high as 100 times the chlorine dioxide concentration. The ratio of the chlorine dioxide concentration to the sum of the chlorine dioxide concentration and chlorite anion concentration in such solution is at least 0.5:1 by weight.

Chlorine dioxide may also be produced by including a metal chlorate and an acid source in the core. The metal chlorate may be sodium chlorate, and the acid source may be sodium persulfate, potassium persulfate, or potassium monopersulfate. A filler (e.g., mineral salts, clays, zeolites, silicate, silica) may be added to the core if desired.

In another embodiment, the reactant is urea peroxide, calcium peroxide, magnesium peroxide, sodium percarbonate sodium perborate, persulfate(s), monopersulfate, persilicate, perphosphate, sodium, lithium, or potassium peroxide. A chlorate donor such as sodium chlorate, potassium chlorate, lithium chlorate, magnesium chlorate, and calcium chlorate may be included in the core.

Where the target product is a hydroxyl radical, the core composition may be about 10-80 wt. % reactant, about 0.001-20 wt. % a transition metal, and about 1-50 wt. % pH buffer. In addition, a binder and a filler may be used. However, each of the binder and the filler is preferably not present in an amount exceeding 50 wt. % of the core. The reactor in the core may be urea peroxide, calcium peroxide, magnesium peroxide, sodium percarbonate sodium perborate, persulfate(s), monopersulfate, persilicate, perphosphate, sodium, lithium, permanganate, or potassium peroxide. The transition metal may include a chelating agent selected from a group consisting of trisodium pyrophosphate, tetrasodium diphosphate, sodium hexametaphosphate, sodium trimetaphosphate, sodium tripolyphosphate, potassium tripolyphosphate, phosphonic acid, di-phosphonic acid compound, tri-phosphonic acid compound, a salt of a phosphonic acid compound, ethylene diamine-tetra-acetic acid, gluconate, or another ligand-forming compound.

Hydroxyl radical may be produced with a reactor that contains a metal catalyst. The metal catalyst may be contained in the core, coated on the core, or included in the reactor wall, for example in the pores on the membrane. The metal catalyst may be Cu (II), Mn (II), Co (II), Fe (II), Fe (III), Ni (II), Ti (IV), Mo (V), Mo (VI), W (VI), Ru (III), or Ru (IV). Upon dilution with water the composition releases peroxide. Under neutral to acidic conditions is converted to hydroxyl radicals upon reaction with the catalyst. The catalyst remains unaltered.

Where the target product is a singlet oxygen, peroxide salts such as calcium, magnesium, sodium peroxides, perborate, percarbonate, may be used as the reactant with a metal catalyst selected from transitional metals.

7) Core Configurations

Generally, the core composition is broken down to about 1-90 wt. % oxidizer reactant and about 1-50 wt. % oxidizable reactant, although there may be exceptions, as described above. Preferably, the oxidizable reactant is about 10-50 wt. % of the core.

There are different configurations in which the core can be prepared, depending on the types of equipment available, the core composition, and the solubility characteristics of the core components.

A first configuration is a layered configuration wherein the different components form discrete layers. In this configuration, the oxidizable reactant is separated from the oxidizer reactant by a layer of a third component. This can be accomplished, for example, by spray coating or adding components in separate mixing stages, such as in a fluidized bed drier, to produce separate layers. When using this method, controlled diffusion rates through the reactor coating is achieved to ensure that adequate reaction internal to the reactor happens prior to diffusion of the target product(s). The diffusion rates can be further controlled by arranging the layers such that the most soluble component makes up the innermost layer of the core.

A second configuration is a homogeneous core. In this configuration, the core components and the binder are combined and mixed to form a homogenous core. The binder can be any one or more of the compounds mentioned above, and one or both of the oxidizer reactant and the oxidizable reactant are immiscible with the binder. The mixing can be carried out in a blender/mixer, agglomerator, or a fluidized bed device. If there is moisture in the core, it can be either dried to remove any final moisture. If non-solvents are used to enhance agglomeration, moisture is removed even if other residual volatiles may remain. Alcohols, for example, which are compatible with potassium monopersulfate and can be formed into a gel or virtual solid by adding rheology modifiers like Carbopol®, may remain. Thus, although there may be volatile components in the final composition, the core is substantially free of moisture. Any reference to "drying" during processing the reactor refers to the removal of water, and does not necessarily imply that all volatiles are removed.

A third configuration includes a solution or gel. A slurry is prepared by suspending the core components in a solution or gel. The agent(s) used to suspend the components must have properties such that either one or both of the oxidizer reactant and the oxidizable reactant are immiscible in the solution or gel. The agents used as solution or gel can be either removed or can remain as part of the final core product.

The descriptions of various components and examples of said components are not meant to limit the invention. Other unspecified compounds that perform the same function are considered within the scope of the invention.

8) Producing the Core

The core is first produced by using any or a combination of suitable conventional equipment and techniques. Regardless of the equipment or technique, an effective amount of reactants are distributed within the reactor core. The term "effective distribution" is defined by the core's ability to generate the target product(s) when exposed to water. The components comprising the core can be fed into a mixer/densifier using high, moderate or low shear such as those sold under the trade names "LÖdige CB30" or "LÖdige CB30 Recycler," a granulator such as those sold under the trade names "Shugi Granulator" and "Drais K-TTP 80". In some cases, a binder can be combined to enhance core formation. The core components can also be fed into the mixer or agglomerator at separate stages as to form layers thereby separating the oxidizer reactant from the oxidizable reactant. This is relevant when moisture addition is involved in the processing. However, when solvents or binders are used in which at least one of the oxidizer reactant and the oxidizable reactant are immiscible, the core components can be combined in one single stage or in multiple stages.

The core can be formed by directly feeding the reactants into the agglomerating equipment. Once fed to the device, a pressure ranging from about 1,000 to about 10,000 psig is applied. The actual pressure is determined based on the final composition, the desired density of the resulting agglomerate composition, the desired dissolution rates, and the like. The resulting high density agglomerate composition can be crushed or ground to produce cores having a specific particle size.

Examples of equipment suitable for producing the massive body include: compactor, agglomerator, roll compaction, briquetting/tableting and the like. Some of these suitable equipment are obtainable from Hosokawa Micron Corporation.

Furthermore, a spray-drying tower can be used to form a granular core by passing a slurry of components through the spray drier. The reactants and other components that make up the core are fed as a slurry to a fluidized bed or a moving bed drier, such as those sold under the trade name "Escher Wyss." When using a fluidized bed or a moving bed drier, care must be taken to consider the solubility and reactivity of the components in the core. For example, a halide donor combined directly to the PMPS in a moist environment will give off chlorine gas. To prevent this chlorine emission, the PMPS may first be coated to prevent direct contact between the halide and moisture. Alternatively, an intermediate solvent may be used to shield the PMPS from the moisture. The intermediate solvent is selected such that either the coated PMPS or the halide salt is insoluble or have poor solubility (i.e., alcohols). A binder that is un-reactive with the oxidizer reactant can be combined into the core either before or during the spray drying or spray graining process to enhance agglomeration without compromising oxidizer activity.

In another aspect of the invention, the core components are combined in an alcohol solution that is thickened with a rheology modifier, and then dried in a spray drier, fluidized drier, or the like. This alcoholic gel improves the long-term storability of reactants such as PMPS by further preventing the reactants from coming into contact with water. More details about the alcoholic gel is provided in a copending U.S.

patent application Ser. No. 10/913,976 filed on Aug. 6, 2004, which is entitled "Storing a Composition in an Alcoholic Gel." The combining of the reactant components may be done in-situ during the fluidizing process. Alternatively, the components may be combined externally in a granulator, densifier, agglomerator, or the like prior to the fluidizing process.

Spray graining layers of core components is another way of preventing direct contact between the oxidizer reactant and precursors such as halides that may induce the production of halogen gas. This method is useful when membrane-based coatings are applied as described herein. The membrane-based coating sufficiently suppresses diffusion of the dissolved components through the pores due to osmotic pressure. Molecular diffusion is sufficiently slow to allow for the reactants to dissolve and react prior to diffusion of the produced agent(s).

The oxidizer reactant of the core can be coated with an aqueous solution or slurry of the components that make up the remainder of the core while suspended in a fluidized drier system. The resulting core composition can be either dried and removed from this stage of the process, agglomerated while in the fluidized bed drier, or removed and further mixed using equipment such as the mixer/densifier discussed above.

To further enhance the processing options and maintain the activity of the oxidizer reactant, the oxidizer reactant may be coated independently of other core components to enhance its processing survivability. The coating material may include inorganic as well as organic materials such as alkali metal salts, polysaccharides, etc. The coating must have sufficient solubility when exposed to the environmental conditions inside the reactor. For example, alkali metals salts such as magnesium carbonate function as anti-caking agents for PMPS and enhance the oxidizer's processing survivability. However, when exposed to an acidic environment, the alkali rapidly dissolves, exposing the PMPS. Chitosan is another example of a coating that improves the product's process survivability and hygroscopicity. Under normal storage conditions, when exposed to acidic conditions and in particular organic acids, the polymer becomes very hydrophilic and rapidly dissolves exposing the PMPS. This condition can be exploited by including organic acid donors such as succinic acid into the core composition when using chitosan-coated PMPS.

Multiple oxidizers can be generated by altering the ratio of core components. Combining reactants to produce N-chlorosuccinimide, hypochlorous acid, and chlorine dioxide can provide synergistic effects from one product by using multiple mechanisms of oxidation.

Examples of oxidizable reactants consumed or altered in the reaction with the oxidizer include but are not limited to: halogen donors such as NaCl and NaBr, organic carboxylic acids having from 1-10 carbons and at least 1-carboxylic acid (COO—) group such as citric acid or acetic acid donors, ketones, and aldehydes. Examples of oxidizable substances not consumed or altered in the reaction are: transition metal donors such as iron or copper salts or bound by chelants.

Coating Material for the Reactor Wall

After the reactants are selected, the coating material for encapsulating the reactants is selected. With proper selection of coating material based on its solubility in water, water permeates through the coating and activates the reactants inside by dissolving them. The solubility of the coating material is lower than the solubility of the reactants or the target product, so that the solution in the reactor space does not readily leave the reactor. At the same time, the reactants are contained within the walls of the coating and not allowed to diffuse out through the coating until the reaction has progressed beyond a critical point. By restricting the diffusion of reactants, their respective molar concentrations inside the coating remain high, increasing the yield of the agents. The coating material may include silicate, cellulose, chitin, chitosan, polymaleic acid, polyacrylic acid, polyacrylamides, polyvinyl alcohols, polyethylene glycols, and their respective surrogates. This is an exemplary list and is not intended to be exhaustive.

The pores and other openings in the reactor wall allow the target product to migrate out of the reactor. The target product may be dissolved in water to form an oxidizing solution. Initially, osmotic pressure on the reactor wall increases, thereby squeezing in the main solvent into the reactor. A controlled permeation of the target product from the inside of the reactor occurs to prevent the reactor wall from rupturing. This permeation is enhanced by the gas(es) often produced during the chemical reaction in the reactor. The rate of permeation both into and out of the reactor is controlled by the size and the number of the pores or other types of openings in the reactor wall.

Two properties that are desirable in the coating material are: 1) it allows for adequate permeation of water to dissolve the reactants in the core, thereby triggering a chemical reaction inside the reactor, and 2) it acts as a barrier for preventing the reactants from diffusing out to the water body before the reaction has progressed enough to have generated a predetermined level of the desired target product. Both of these properties depend on the solubility of the coating material, which in turn may depend on the surrounding conditions (e.g., pH, solvent type). Thus, the elements surrounding conditions should be taken into consideration when choosing the coating material.

In addition to the coating material that forms the reactor wall, the reactor 100 may have other layers, such as a protective layer for shielding the reactor 100 from various environmental elements, thereby preventing premature activation of the reactor from moisture in the air. The protective layer may be formed with a polymer, polysaccharide, polysiloxane, or silicate that is soluble in the main solvent so that it does not interfere with the function of the reactor during use.

1) Silicate-based Coating Material

Examples of coating material include silicates, silicones, polysiloxane, and polysaccharides including chitosan and chitin. The silicate-based coating material may be something that contains silicate, such as metasilicate, borosilicate, and alkyl silicate.

How suitable a particular coating material is for a given application depends on the surrounding conditions. For example, silicate coatings are well established for providing a barrier film of protection to percarbonates and other bleaching agents used in laundry detergents but do not always make a reactor. In laundry detergents, the inclusion of bleach precursors such as tetraacetyl-ethylenediamine or nonanoyl-oxybenzene sulfonate to enhance the bleaching performance in low temperatures is common. The hydrolysis of the precursors requires alkaline pH conditions. In such applications, due to the hydrolysis requirements and peroxygen chemistry, the internal and external solution used to dissolve the reactants is high in pH. The silicate coating is soluble under alkaline conditions, and the integrity of the reactor wall is compromised. The coating dissociates rapidly, without acting as a reactor. In this case, the benefit of the high reaction yield is not achieved.

Silicates provide for a simple and inexpensive reactor coating when used in lower pH applications or formulations that result in internal acidic pH conditions that sustain the integrity of the reactor wall. This usefulness of silicates remains uncompromised even if the external conditions are alkaline in pH, such as in the case of laundry water. Silica solubility is poor at low pH. At lower pH, silica remains colloidal and forms a colloidal gel. When monopersulfate (MPS) and a source of chloride such as NaCl are encased within a coating of silicate such as sodium silicate, then added to water, the water permeates through fissures and cracks in the coating and dissolves the reactants. The resulting low pH (<5) from the dissolving MPS suppresses the dissolution rate of the surrounding silica, and the silica remains as a colloidal gel.

Inside the space enclosed by the silica gel coating, the concentration of reactants remains high and the resulting reactions produce high yields of chlorine gas. Upon diffusion of the reactants and the chlorine into the surrounding water, hypochlorous acid and hypochlorite ions form as a function of the water's pH. The resulting conversion to the target product is therefore much higher when the pH inside the reactor is low and the reactor wall remains undissolved. With the inclusion of N-succinimide, it is now possible to produce N-chlorosuccinimide with the slow-diffusing chlorine gas. pH buffers can be added to further ensure efficacy based on application requirements. In alkaline pH conditions such as laundry bleaching, the elevated pH will not allow for generation of the N-chlorosuccinimide. By sustaining the integrity of the reactor, the internal conditions of the reactor are such that the reactions are successfully carried out. The target product is efficiently generated and released.

2) Polymer Surfactant Coating Material

In some embodiments, the reactor wall is made of a generally hydrophobic substance that includes hydrophilic constituents. A mixture of hydrophobic and hydrophilic substance is applied to the core and dried. Upon addition of water, the hydrophilic component dissolves and the hydrophobic polymer remains intact, forming a porous shell around the core. Water permeates through the pores to reach the core and trigger a chemical reaction. Then, eventually, after the critical level is reached, the hydrophobic substance disintegrates. More details about this coating process are provided below.

Applications where alkaline pH aquatic conditions are achieved or increased control of diffusion rates is desired can utilize hydrophobic coatings combined with hydrophilic agents. This hydrophobic coating material may be useful with an alkaline-pH aquatic environment where the silicate coating is ineffective as a reactor. As mentioned above, hydrophobic coatings may possess hydrophilic portions, such as some hydrophilic functional groups inherent in the polymer structure. However, the hydrophobic coatings have a hydrophobic backbone that limits their solubility substantially, thereby allowing them to effectively function as a reactor by maintaining the integrity of the reactor walls until the reaction inside has progressed beyond a critical point. This critical point may be defined by a condition such as the pH of the solution inside the reactor or the concentration of the target product.

Examples of hydrophobic polymers include but are not limited to polyoxyethylene alcohols such as $R(OCH_2CH_2)_nOH$, $CH_3(CH_2)_m(OCH_2CH_2)_nOH$, and polyoxyethylene fatty acid esters having the general formula $RCOO(CH_2CH_2O)_nH$, $RCOO(CH_2CH_2O)_nOCR$, oxirane polymers, polyethylene terephthalates, polyacrylamides, polyurethane, latex, epoxy, and vinyl, cellulose acetate. Suitable hydrophilic components include but are not limited to: polycarboxylic acids such as polymaleic acid, polyacrylic acid, and nonionic and anionic surfactants such as ethoxylated or sulfonated alkyl and aryl compounds.

The non-solvent is generally hydrophilic and is removed after the application of the coating to leave voids and channels. The amphipathic agent is used to combine the polymer coating with the hydrophilic non-solvent. The resulting coat is usually micro-porous but the process may be altered to form macro-porous voids and channels. The ratio of solvent to non-solvent as well as non-solvent selection can be adjusted to provide varying degrees of pore size, distribution, and symmetry.

Polysiloxane emulsified in water using water-soluble surfactants provides for an effective coating in pH-sensitive applications. The emulsion is applied to the composition's core (i.e., to the reactants) and then dried, as is performed in the application of the silicates. However, when exposed to water, the hydrophilic component dissociates, forming pores in the hydrophobic polysiloxane coating. The water then permeates into the reactor dissolving the core and activating the reactants. The reactions produce the desired target products in high yield, and these target products act on the bulk body of water when the reactor wall dissolves. Due to the high chemical stability of the polysiloxane, the integrity of the reactor coating remains uncompromised in alkaline pH conditions.

Another version of this method is to combine a non-ionic waxy surfactant with the solvent, wherein the surfactant acts as the non-solvent. A polymer such as cellulose triacetate is dissolved in the solvent that is mixed with the surfactant, and resulting solution is applied to the core. The solvent is evaporated, leaving behind the non-solvent that carries the polymer. Upon contact with water, the non-solvent dissolves and leaves behind the water-insoluble polymer, thereby forming pores in the polymer coating.

Yet another version of this method is to combine a mineral salt in a solvent such as 1,3-Dioxolane, dissolve a polymer such as polyester in the solvent, and apply the resulting solution to the core. Upon exposure to water, the mineral salts dissolve, leaving voids in their place.

3) Membrane

In another embodiment, the reactor wall 10 is a hydrophobic and porous membrane. A second coating can be applied to improve the shelf life in high-humidity storage conditions. To further improve on the diffusion rates by providing for a controlled porosity and pore symmetry, the hydrophobic components such as cellulose acetate can be dissolved in a solvent and combined with a non-solvent that is amphipathic or has a hydrophilic functionality. After forming the coating, both the solvent and non-solvent are removed (e.g., evaporated) leaving a coat with specific porosity. The porosity can be altered by controlling the ratio and types of non-solvent and solvent to the hydrophobic component. For example, addition of ethanol into a mixture of acetone/water-magnesium perchlorate (solvent/non-solvent mixture) produces asymmetrical pores. "Solvents" have the ability to dissolve the hydrophobic polymer while being soluble in the non-solvent.

In some embodiments, the non-solvent can be a gas such as air that is entrained in the solvent-polymer mixture. This entrained air can be achieved by producing a foam using established foam generating techniques. Upon contact with the core, the foam collapses while evaporation forms the polymer coating. The entrapped air is released, leaving behind pores and channels.

The hydrophobic component can be any number of thermoplastics and fiber forming polymers or polymer precursors, including but not limited to polyvinyl chloride, polyacrylonitrile, polycarbonate, polysulfone, cellulose acetates, polyethylene terephthalates, and a wide variety of aliphatic and aromatic polyamides, and polysiloxane. Using this coating technology, a membrane with controlled porosity is produced. Representative synthetic polymers include polyphosphazines, poly(vinyl alcohols), polyamides, polycarbonates, polyalkylenes, polyacrylamides, polyalkylene glycols, polyalkylene oxides, polyalkylene terephthalates, polyvinyl ethers, polyvinyl esters, polyvinyl halides, polyvinylpyrrolidone, polyglycolides, polysiloxanes, polyurethanes and copolymers thereof. Other suitable polymers include, but are not limited to, methyl cellulose, ethyl cellulose, hydroxypropyl cellulose, hydroxypropyl methyl cellulose, hydroxybutyl methyl cellulose, cellulose acetate, cellulose propionate, cellulose acetate butyrate, cellulose acetate phthalate, carboxymethyl cellulose, cellulose triacetate, cellulose sulfate sodium salt, poly(methyl methacrylate), poly(ethyl methacrylate), poly(butyl methacrylate), poly(isobutyl methacrylate), poly(hexyl methacrylate), poly(isodecyl methacrylate), poly(lauryl methacrylate), poly(phenyl methacrylate), poly(methyl acrylate), poly(isopropyl acrylate), poly(isobutyl acrylate), poly(octadecyl acrylate) polyethylene, polypropylene, poly(ethylene glycol), poly(ethylene oxide), poly (ethylene terephthalate), polyvinyl acetate), polyvinyl chloride, polystyrene, polyvinyl pyrrolidone, and polyvinyiphenol. Representative bioerodible polymers include polylactides, polyglycolides and copolymers thereof, poly(ethylene terephthalate), poly(butic acid), poly(valeric acid), poly(lactide-co-caprolactone), poly[lactide-co-glycolide], polyanhydrides, polyorthoesters, blends and copolymers thereof.

More specifically, cellulose acetate phthalate such as CA-398-10NF sold by Eastman Chemical Company may be used as the coating material. Under low pH conditions like those previously described for production of N-chlorosuccinimide, the coating remains stable. However, when the core components are depleted, the higher pH (>6.0) dissolves the coating. The porosity can be controlled by dissolving the cellulose in a solvent, then adding an effective amount of non-solvent. After application of the coating, the solvent and non-solvent are removed via evaporation, leaving behind a membrane with a distinct porosity. The porosity can be further altered in symmetry, number of pores, and size of pores by altering the coating components and processing. For example, a decrease in solvent to polymer (S/P) ratio, an increase in nonsolvent/solvent (N/S) ratio, an increase in nonsolvent/polymer (N/P) ratio in the casting solution composition, and a decrease in the temperature of the casting solution tend to increase the average size of the pores on the surface of resulting membranes. Further, an increase in S/P ratio in the casting solution composition, and an increase in the temperature of the casting solution, tend to increase the effective number of such pores on the membrane surface.

Some applications may benefit from a membrane that provides a long term treatment with antimicrobial agents. After the core is extruded, the membrane coating is formed by either directly applying a film-forming membrane and evaporating off any solvents (including water) and non-solvent in the membrane. Alternatively, after the core is extruded, the phase inversion process may be used to produce long fibrous micro-reactors that can be woven or combined with woven materials. The membrane formation process will now be described.

To further improve the stability of the formed polymer membrane, an alloy component can be incorporated into the membrane to form an alloyed reactor wall membrane. For example, addition of poly(phenylene oxide dimethyl phosphonate) to cellulose acetate on a 1:1 w/w mixture can increase membrane tolerance from a pH of <8 to a pH of 10-10.7 for extended usage. An alloying compound is typically an organic component that is combined with the primary hydrophobic component that enhances the polymer membrane's chemical and/or thermal stability. The alloying compound can also be a cross-linking agent such as triflic acid with phosphorous pentoxide, trifluoromethansulfonate, glycouril, bifunctional organosilane, etc., or a plasticizer.

In some embodiments, a cross-linking agent that enhances the structural integrity and rigidity with a polymer precursor such as styrene is included in the reactor wall. Styrene, a cross-linking agent such as divinylbenzene, a solvent, and non-solvent are mixed and applied to form an effective film, followed by the step of initiating polymerization by applying a persulfate or activating peroxide solution before removing the solvent and non-solvent by evaporative drying. The persulfate may be applied during the removal of the solvent and non-solvent, in situ. After the drying, a plastic coating layer having a micro- or macro-porous structure with substantially improved rigidity and strength is obtained.

A plasticizer may also be used to increase the pliability as well as alter the hygroscopicity of the membrane coating.

Alloying compounds such as plasticizers and cross-linking agents may be incorporated into the reactor wall to further improve its structural integrity and/or stability across different temperature and pH ranges. The cross-linking agents may be, for example, glycoluril or bifunctional organosilanes. As stated above, the alloying component can also be a cross-linking agent such as triflic acid with phosphorous pentoxide, trifluoromethansulfonate, and the like.

4) Multiple Reactor Walls

A single reactor may contain more than one reactor wall. For example, a silicate-coated-core can be further treated with a second coating of chitosan to improve its fluidity and hygroscopic properties. Upon exposure to a bulk quantity of water, the chitosan is dissolved and the silica-coated reactor is exposed. Also, where enhanced storage stability is required, such as high humidity exposure, a secondary coating that enhances the hygroscopicity of the reactor-encased composition may be applied. The invention is not limited to a specific number of reactor wall. Examples of dual-reactor embodiments are provided below. Reactors may also be prepared with more than two layers of reactor walls, depending on the application.

4) Forming the Reactor Wall

The coating material may be applied to the core in the form of an aerosol, a liquid, an emulsion, a gel, or a foam to form the reactor wall. The preferred form of coating depends on the composition of the coating being applied, the application equipment, and conditions. The coating generally comprises from 0.2 to 5% of the total weight of the micro-reactor. However, the actual amount of membrane coating can vary based on the size of the reactor, porosity and the like.

In one aspect, the invention is a method of producing the reactor described above, and also a method of using the reactor to treat an aquatic system. The invention is a method of generating high yields of oxidizers, biocides and/or virucidal agents in-situ by using the reactor that is described above. The reaction in the reactor is triggered when the reactor is exposed to the body of water that is to be treated by the products of the reaction.

The core that is formed as described above is coated with an effective amount of coating material. The "effective amount" of coating takes into consideration the solubility characteristics of the coating under the conditions in the application so as to ensure that the structural integrity of the reactor remains sufficiently intact until such time as the reactants have been depleted. The coating material may be applied by using any effective means of distributing the coating material over the surface of the core, such as spray coating in a fluidized bed, or applying a foam or liquid containing the coating material and mixing. Then, the coated composition is dried by using an effective means of drying, such as a fluidized drier or a tray drier, rotary drier and the like.

Once the core has been produced, the coating is effectively applied in the form of liquid, foam, gel, emulsion and the like. The coating can be applied by aerosol, spray, immersion and the like. The coating may be applied with a mechanical mixing device such as a blender/mixer, then dried using any number of batch or continuous drying techniques such as tray driers, rotary driers, fluidized bed driers, and the like. The preferred technique is to accomplish coating and drying in a continuous fluidized bed drier. The fluidized bed drier can incorporate multiple stages of drying to apply multiple applications of coating, perform different steps in the coating process (i.e., coating, polymerization, evaporation) and the like under continuous or batch processing. Generally, the product temperature during the coating process should not exceed 100° C. and preferably 70° C. During membrane coating, the application of the coating should occur at <50° C. and preferably <30° C. depending on the solvent and non-solvent that are used.

The order of application, evaporation, drying, etc. of the coating material varies based on the types of polymers, solvents, non-solvents and techniques used to produce the porous membrane. For example, a cellulose acetate membrane is effectively applied by first dissolving the cellulose polymer in a solvent, then adding a non-solvent such as water and magnesium perchlorate to produce the gel. The gel is coated on the core by spraying or otherwise applying a thin film of gel onto the surface of the core, then evaporating the solvent and the volatile components of the non-solvent.

A polyamide membrane can be produced by using the method that is commonly referred to as the "phase inversion process." The phase inversion process includes dissolving a polyamide in a solvent such as dimethyl sulfoxide to form a gel, applying the gel to form a thin film, then applying the non-solvent to coagulate the polymer. Then, the solvent and non-solvent are evaporated.

EXAMPLE 1

This example illustrates the generation of N-chlorosuccinimide using the invention, and explains its utility.

Conventionally, laundry bleaching utilizes liquid or dry chlorine bleaching agents for white fabrics and peroxygen compounds such as percarbonate for colored fabrics. To further improve the removal of colored stains, precursors are incorporated into the laundry detergents to produce peracids (e.g., peracetic acid) in-situ. The effectiveness of these treatments is based on factors such as contact time, temperature, concentration, types of stains, demand for oxidants in the water, and the like.

Generally, the effectiveness of treating color stains and in many cases stains on white fabrics is limited. Thus, additional treatment steps are commonly employed to successfully remove the stains, as illustrated in the published application WO9923294. This published application discloses a multi-step process to improve the effectiveness of stain removal, wherein one of the steps employs dioxirane.

By utilizing the reactor, a combination of agents, each with its own selective order of reactions, may be employed in one step. The synergistic effect of combined treatments substantially improves performance in stain removal without the problems associated with high dosages of single indiscriminate treatments, such as bleaching of colors and fabric decomposition).

Set-in protein based stains are difficult to treat due to their insoluble composition. Peroxygen compounds and peracids are effective at decomposing the soluble components that increase the COD of the wash water. However, the efficiency of the reactions (gms oxidant/gm COD) needs to be considered for bleaching efficacy. By selecting reactant components based on their reaction selectivity, the efficacy of the bleaching process is improved.

The difficulty in selecting and applying the components is a result of their storage stability, ability to formulate, and condition (chemistry) requirements for in-situ generation. For example, acid catalyzed reactions are not well suited for the alkaline conditions experienced in laundry wash water.

By employing the reactor of the invention, the issues of stability, formulation, and in-situ generation are addressed. Lower levels of highly selective agents can be produced in-situ that carry out specific tasks. For example, N-chlorosuccinimide is very effective at decomposing tryptophan peptide bonds that bind the high molecular weight (water insoluble) proteins. N-chlorosuccinimide may be generated using a core that includes a halogen donor such as NaCl and an oxidizer such as potassium monopersulfate, persulfates, or peroxyphthalate. The halogen donor and the oxidizer will produce hypohalite ($OCl^-$). With the pH suppressed to <6.0, chlorine gas results as an equilibrium product of the halogen species. Including a N-hydrogen donor such as N-succinimide, isocyanuric acid, 5,5-alkylhydantoin, or N-sulfamate, a stable antimicrobial agent is produced such as N-chlorosuccinimide as in the case of N-succinimide reacting with chlorine gas.

When decomposition occurs, smaller water-soluble byproducts are produced. The carbon based compounds are readily oxidized by oxygen-based oxidizers such as dioxirane, peracids or chlorine dioxide. Hydroxyl radicals further enhance decomposition of these compounds and significantly improve the rate of decomposition by hydrogen cleavage, radical formation, and autocatalytic decomposition.

The result of utilizing selective chemistry minimizes the amount of reactants that is required while maximizing bleaching efficacy. Resistant stains that otherwise survive non-chlorine bleach detergent blend are effectively cleaned without the damage resulting from higher concentrations, direct contact with ready to use bleaching agents, and use of indiscriminate bleaching agents. It also provides for an easy single-step application.

EXAMPLE 2

The reactor of the invention may be used to generate multiple target products by customizing the reactions and selecting the reactants for a specific application. For example, in bleaching processes, combining dioxirane and peracids with residual PMPS provides for multiple mechanisms of oxidation and bleaching. In antimicrobial applications, combining chlorine dioxide with residual hypohalite and/or haloimide provides for a broad-spectrum inactivation of microorganisms and enhanced efficacy over single species applications. This example illustrates the generation of peracetic acid and dioxirane using an acidic reactor environment.

Figure 4A:
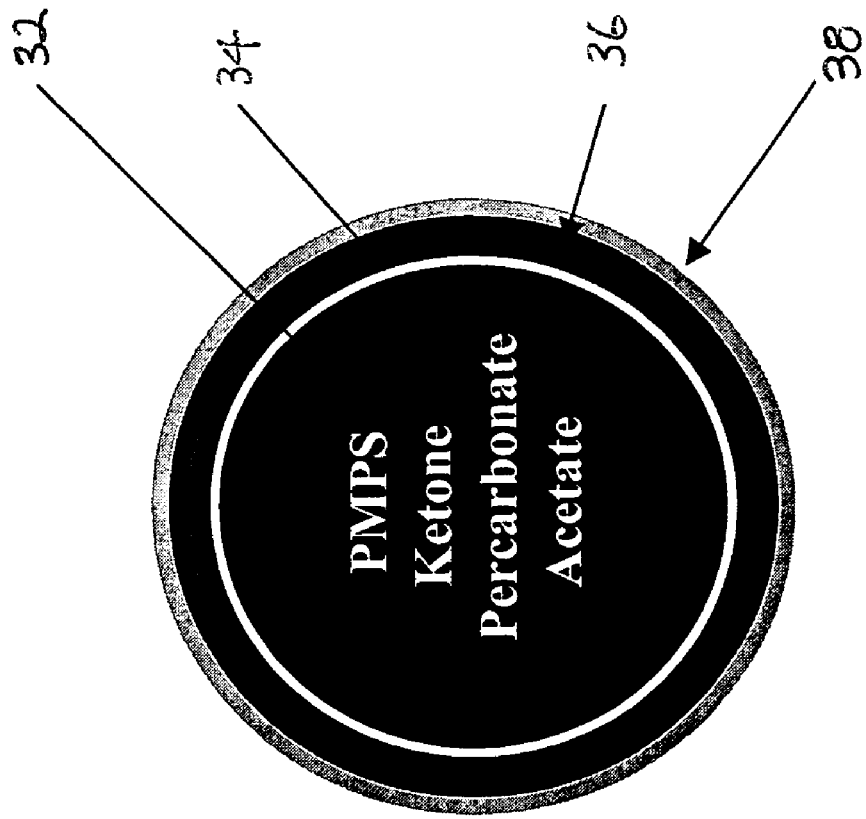

FIGS. 4A, 4B, 4C, 4D, 4E, and 4F show a reactor 30 for generation of multiple target products under acid catalyzed conditions. The target products include peracetic acid, which is most efficiently produced under low pH, and dioxirane, which is most efficiently produced under neutral-pH conditions. As shown in FIG. 4A, the reactor 30 includes a core 32, a silicate coating 34, an alkali salt coating 36, and a cellulose triacetate membrane 38. The core 32 includes PMPS (the oxidizer reactant), ketone, percarbonate, and acetate.

The reactor 30 is multi-layered. The silicate coating 34 forms an inner reactor, and the cellulose triacetate membrane forms the outer reactor that contains the inner reactor. The inner reactor generates the peracetic acid and the outer reactor generates the dioxirane. By forming the core 32 with an acidic oxidizer reactant such as PMPS, a hydrogen peroxide donor (e.g., percarbonate), an acetic acid donor (e.g., sodium acetate), and a carbonyl donor (e.g., dihydroxyacetone, ketone) in one reactor (e.g., silicate coating), surrounding the reactor with an effective dose of alkali salt (e.g., sodium carbonate), and coating the alkali salt coating 36 with yet a second reactor coating such as a cellulose triacetate membrane 38, the reactor 30 maximizes the generation of peracetic acid and dioxirane.

FIG. 4B shows that upon contacting water, pores form in the cellulose triacetate membrane 38. Moisture permeates the cellulose membrane 38 through the pores and dissolves some of the alkali salt coating 36 and hydrolyzes the silicate coating 34. The silicate coating 34 (colloidal gel), which forms the wall of the inner reactor, allows for moisture to permeate and reach the core 32. Once the moisture permeates to the core, the reactants in the core are activated, creating an acidic condition (FIG. 4C). As shown in FIG. 4C, the activated reactants dissociate, shrinking the core 32 and reducing the pressure inside the reactor 30. Since the cellulose triacetate membrane 38 has pores, the silica coating 34 supports the cellulose membrane 38. Peracetic acid, residual PMPS, and carbonyl donor (e.g., ketone) are generated by the reaction in the inner reactor (FIG. 4C). Because the cellulose membrane 38 is micro-porous, the rate at which the peracetic acid, the residual PMPS, and the carbonyl donor diffuse out of the reactor 30 is limited.

As the peracetic acid, the residual PMPS, and the carbonyl donor from the inner reactor pass into the alkali salt coating 36 as shown by an arrow 39, the rise in pH induces the generation of dioxirane by activating a PMPS-carbonyl donor reaction (FIG. 4D). The peracetic acid, dioxirane, and residual PMPS diffuse through the porous cellulose triacetate membrane 38. The raised pH collapses the silicate coating 34, which then decomposes. Without the silicate coating 34 to provide extra support against the osmotic pressure difference between the inside and the outside of the reactor 30, the cellulose triacetate membrane 38 also collapses (FIG. 4E). After collapsing, the cellulose-based cellulose triacetate membrane 38 dissipates (FIG. 4F) and the reactor 30 is gone.

As illustrated above in FIG. 4A, a reactor may contain multiple sub-reactors (e.g., an inner reactor and an outer reactor) with each sub-reactor generating a specific target product. When generating multiple target products, the target product combinations are selected such that they can be generated under the same conditions.

EXAMPLE 3

This example illustrates the generation of peracetic acid and dioxirane in a neutral to alkaline reactor environment.

Figure 5A:
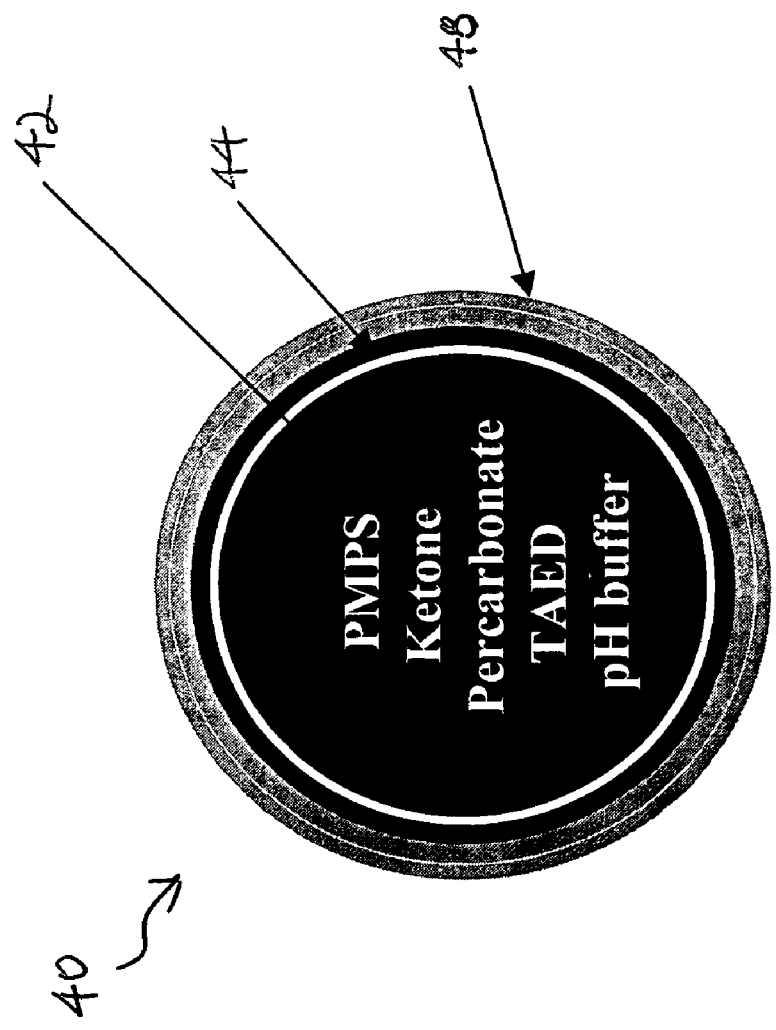
FIGS. 5A and 5B illustrate a micro-reactor for generation of multiple target products under neutral to alkaline pH using stable polyester membrane reactor coating.
Figure 5B:
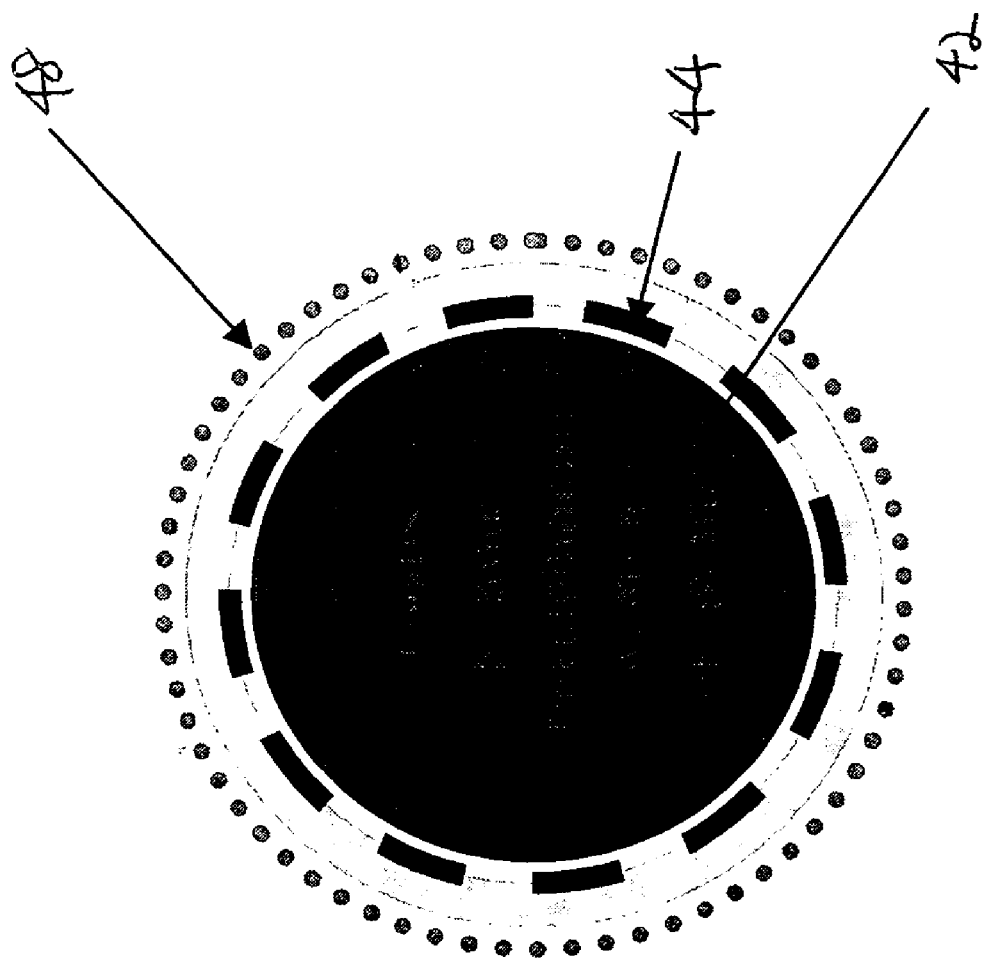

FIGS. 5A and 5B illustrate a reactor 40 for generation of multiple target products under neutral to alkaline pH using stable polyester membrane reactor coating 48. The target products include peracetic acid and dioxirane. As described above, PMPS can be combined with organics containing carbonyl groups (e.g., ketone, aldehyde) to produce dioxirane. Dioxirane formation is most efficient around neutral pH. As FIG. 5A shows, the reactor 40 includes a core 42, a silicate coating 44, and the polyester membrane 48. In the example shown in FIG. 5A, the core contains PMPS, a carbonyl donor (ketone in this case), a percarbonate, an acetate donor such as an ester or an anhydride, and a pH buffer.

Moisture permeates the polyester membrane 48 through the pores in the membrane and hydrolyzes a silicate coating 44 to form a colloidal gel. The silicate coating 44, which forms the wall of the inner reactor, allows for moisture to permeate and reach the core 42. Once the moisture permeates to the core, the reactants in the core are dissolved to form an alkaline condition (FIG. 5B). Tetraacetyl-ethylenediamine (TAED), which is commonly used in laundry bleaching applications to produce peracetic acid under alkaline conditions, reacts with peroxide to produce peracid in high yield in an alkaline condition. The alkaline condition activates a PMPS-carbonyl donor reaction and generates dioxirane. As the reactants dissociate through a chemical reaction, the core 42 decreases in size.

EXAMPLE 4

Figure 8:
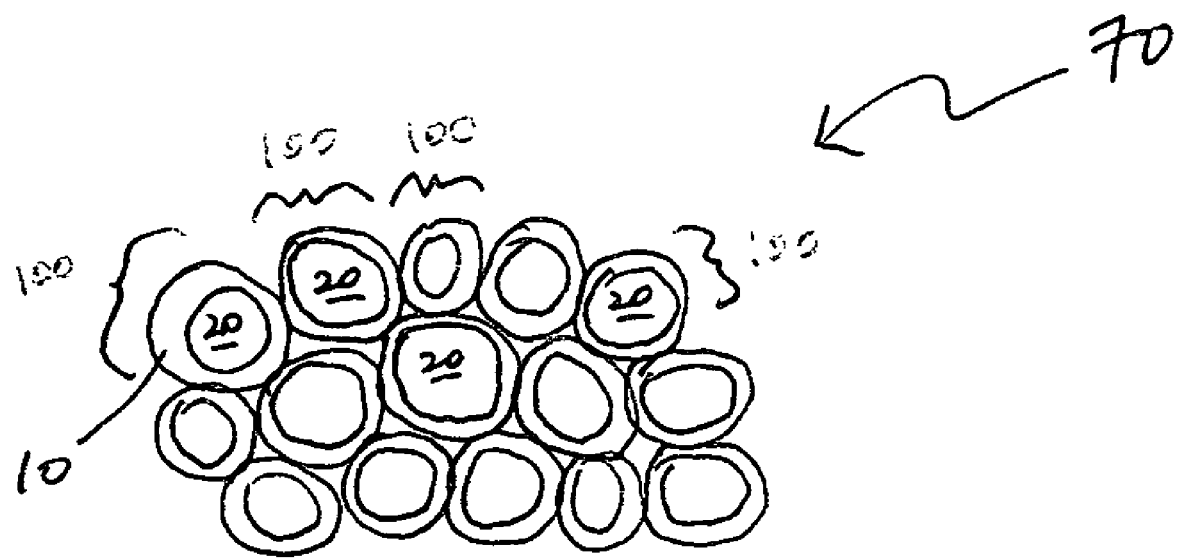
FIG. 8 demonstrates that a plurality of solvent-activated reactors may be agglomerated to form an agglomerate composition.

FIG. 8 demonstrates that a plurality of solvent-activated reactors 30 may be agglomerated to form an agglomerate composition 70. The reactors 30 may be agglomerated with a binder, but does not have to be. To form the agglomerate composition 70, multiple reactors 30 are fed into an agglomerating equipment. Inside the equipment, a pressure of about 1,000 to about 10,000 psig is applied to the reactors 30. The exact pressure to be applied is chosen based on the desired density of the resulting agglomerate composition, which affects how fast the agglomerate composition dissolves and releases the oxidizer. Any commercially available compactor or agglomerator, and generally machines for roll compaction, briquetting/tableting, and the like, may be used for the aggregation of reactors. Hosokawa Micron Corporation offers equipment that are suitable for forming the agglomerate composition.

If desired, the reactors 30 may be mixed with binders or fillers prior to being fed into the aggregating equipment. A binder helps the oxidizer tablets stay together, and a filler makes the agglomerate composition more solid by filling in the gaps between oxidizer tablets. The fillers may also provide added benefits such as pH buffering and coagulation. The binders and the fillers help control the release rate of the oxidizer when the agglomerate composition is placed in a predetermined solvent. They may also provide additional benefits such as pH buffering and coagulation. Some exemplary materials that may be used as binders and fillers include mineral salts, clays, zeolites, silica, silicates, polyaluminum chloride, aluminum sulfate, polysaccharide, and polyacrylamide. The mineral salts, more specifically, may be a choride, carbonate, bicarbonate, hydroxide, sulfate, or oxide of calcium, magnesium, sodium, lithium, potassium. Suitable binder materials include glycoluril, mineral salts, clays, zeolites, silica, or silicates. The binder material affects the rate at which the agglomerate composition dissolves and releases the oxidizer.

Experimental Data

1) Test 1

A 500 ml sample of distilled water was treated with 0.5 grams of 4.8% A.O. potassium monopersulfate (PMPS) and 1.3 grams of N-succinimide. The solution pH was increased to pH 10.13 using $K_2CO_3$. Immediately, 0.5 grams of NaCl was added and the solution was vigorously mixed using a magnetic stirrer for 5-minutes. A 25 ml sample was removed and 3 ml of 0.1-molar EDTA solution was added to neutralize any residual PMPS. The solution pH was 8.2 when DPD reagent was immediately added, producing a faint pink color.

The solution was titrated with a thiosulfate solution whereby 0.6 ppm of chlorine based oxidizer was detected. The result of Test 1 illustrated that producing hypohalites and subsequent haloimides in alkaline conditions does not have any significant advantages or benefits.

2) Test 2

A 500 ml sample of distilled water was treated with 0.5 grams 4.8% A.O. potassium monopersulfate (PMPS), 1.0 grams succinic acid, and 1.3 grams of N-succinimide. The solution pH was measured at pH 3.65. 0.5 grams of NaCl was added, and the solution was vigorously mixed using a magnetic stirrer for 5-minutes. During the reaction period, no chlorine odor was detected. A 25 ml sample was removed and 3 ml of 0.1-molar EDTA solution was added to neutralize any residual PMPS. The DPD reagent was added producing a bright pink color.

The solution was titrated with thiosulfate solution whereby 20.4 ppm of chlorine based oxidizer was detected. The results of Test 2 shows that the same concentrations of reactants under acid conditions efficiently generated 20.4 ppm of N-chlorosuccinimide and/or hypohalite. The lack of chlorine odor and bleaching of the DPD reagent indicates the predominant components was stabilized chlorine in the form of N-chlorosuccinimide.

3) Test 3

A N-chlorosuccinimide generating micro-reactor was produced by combining: 15.15 wt % PMPS, 15.15 wt % NaCl, 30.30 wt % succinic acid, and 39.39 wt % N-succinimide. The combination was placed in a grinder until they formed a fine dusty powder. A solution of 95% ethanol and 5% isopropyl alcohol was treated with 1% Carbopol® to produce a thick gel. 10 grams of gel was added to 100 grams of the fine powder and slowly mixed until the components agglomerated into granules. The granules where transferred to a fluidized drier, whereby they where fluidized while sustaining an exit air temperature of about 65° C. A solution of 30 wt % metasilicate was applied by supplying an aerosol spray into the fluidized stream of granules. A coating made up approximately 2.5 wt % of the total. The granules where allowed to continue drying until the water had been sufficiently removed.

A 500 ml of DI water was treated with $K_2CO_3$ to raise the pH to 10.58. 3.64 grams of the stated micro-reactors was added to the solution and vigorously mixed for 7 minutes. Periodically the solution was checked to see if the core of the reactor had dissolved, and a solution of dissolved $K_2CO_3$ was added to sustain the pH>10.0. It took approximately 5 minutes to dissolve substantially all of the core of the reactors. An additional 2 minutes of mixing was provided.

A 25 ml sample was removed and 3 ml of 0.1-molar EDTA solution was added to neutralize any residual PMPS. The DPD reagent was immediately added producing a bright pink color. The solution was titrated with thiosulfate solution whereby 12.8 ppm of chlorine based oxidizer was detected. The results of Test 3 show that even when the bulk water conditions do not favor generation of N-chlorosuccinimide and hypohalites, the reactor of the invention provided a condition that achieved a 63% conversion.

By further regulating diffusion rates utilizing micro-porous membrane coatings and/or multiple coatings, rather than the macro-porous like that achieve with silicate, still higher conversions are to be expected.

4) Results of Comparative Experiments

Figure 6:
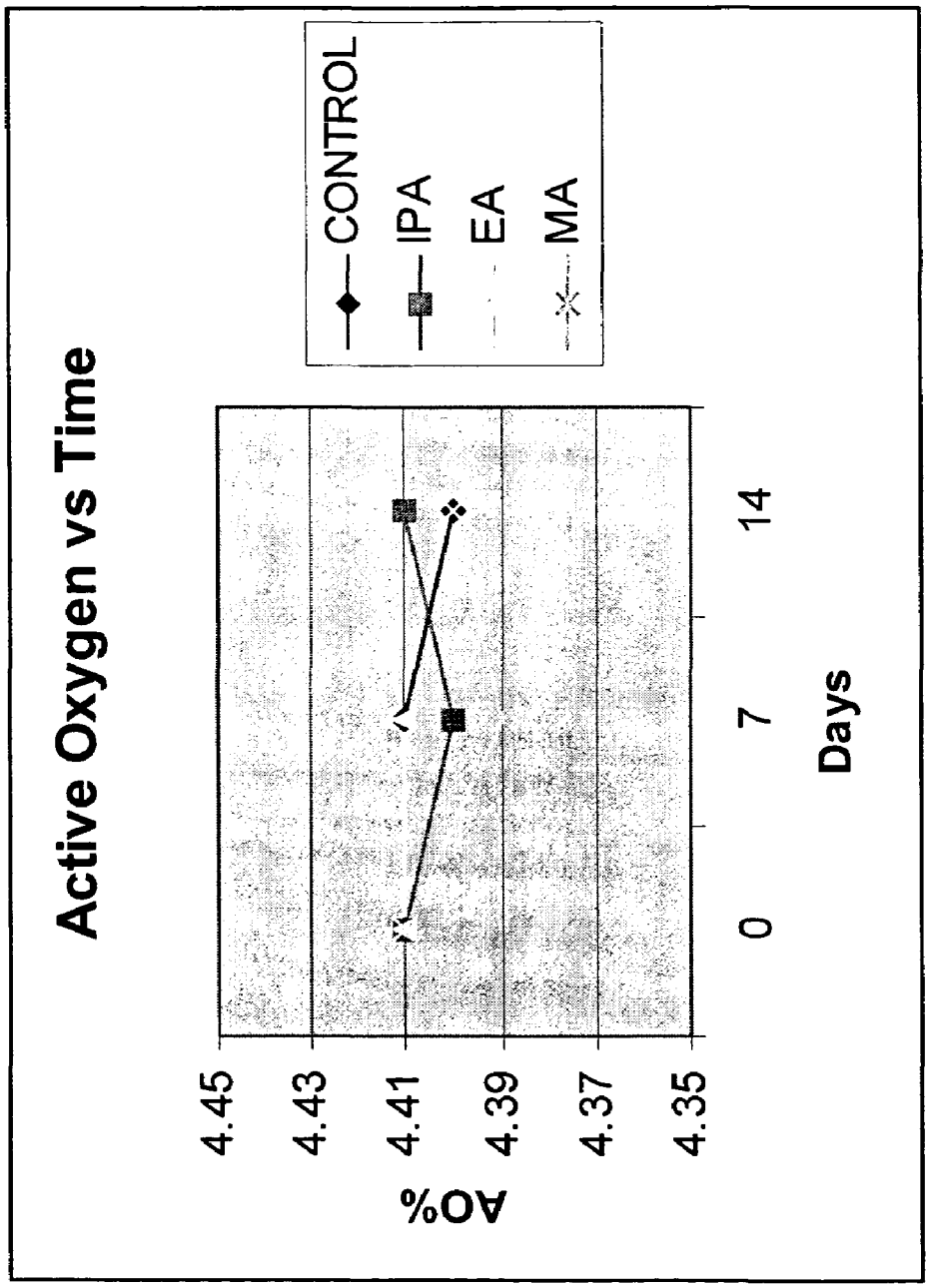
FIG. 6 shows the stability of PMPS in various alcohols which can be used to form suspensions or binders for formation of the core.

FIG. 6 shows the stability of potassium monopersulfate in various alcohols which can be used to form suspensions or binders in the core. As stated above, alcohols may be used to aggregate PMPS into the core, for example when the core is of the homogeneous configuration. The alcohol may be formed into a gel or converted into an almost-solid form by adding rheology modifiers like Carbopol®. FIG. 6 graphicaly summarizes the active oxygen (A.O. %) level in compositions prepared with different alcohols as a function of time (days in storage). The control group did not include any alcohol, and showed a drop in the active oxygen level after 14 days, from 4.41% to 4.4%. In contrast, PMPS stored in isopropyl alcohol (IPA) and ethyl alcohol (EA) showed an increase in the active oxygen level. The PMPS stored with methyl alcohol (MA) showed a significant drop in the active oxygen level in the first week of storage, but then recovered during the second week to match the overall active oxygen level drop of the control group. Although there was alcohol in the tested compositions, their core is substantially free of moisture. FIG. 6 suggests that a core made using EA or IPA may be most effective for stabilizing PMPS.

Figure 7:
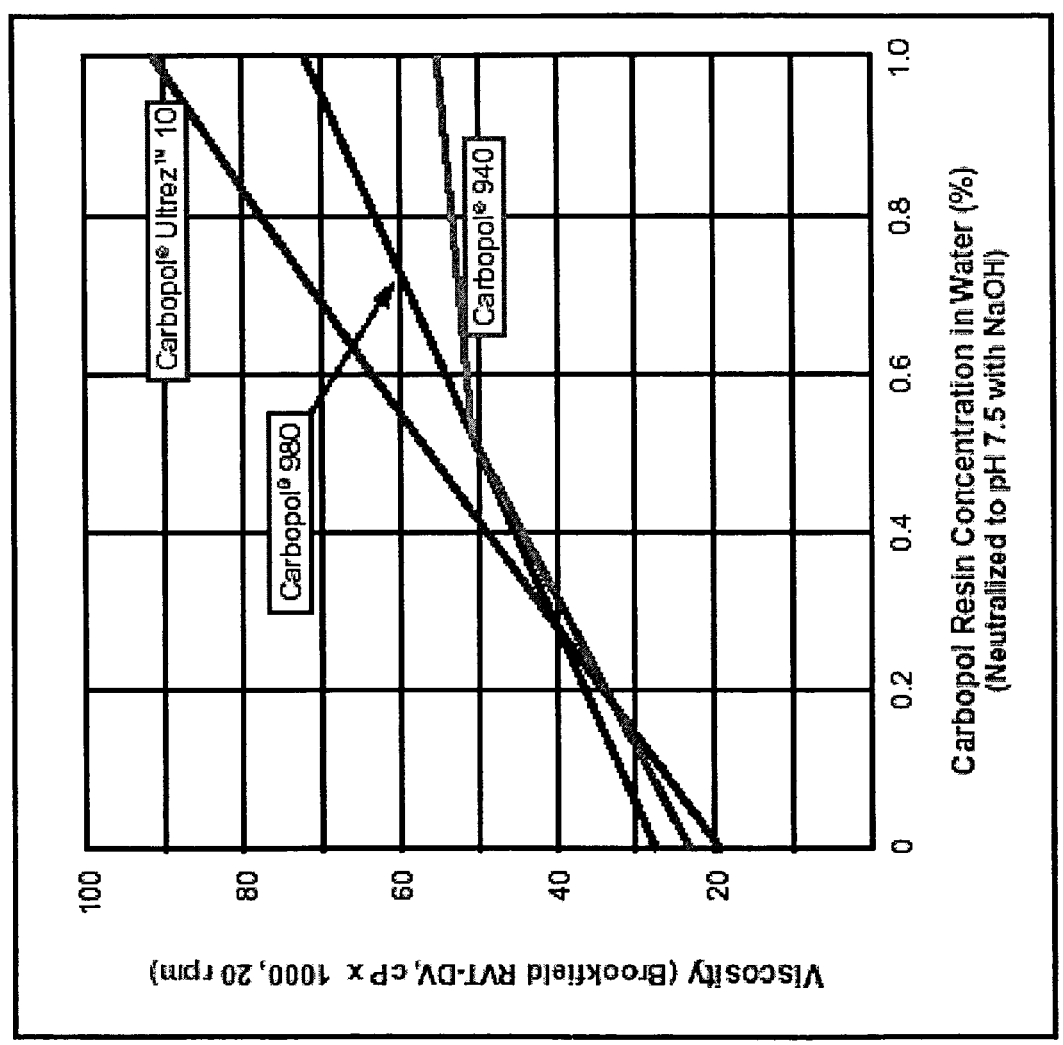
FIG. 7 shows the increase in viscosity provided by Carbopol® used to alter the rheology of the solution.

FIG. 7 shows the increase in viscosity provided by Carbopol® used to alter the rheology of the solution. More specifically, the plot of FIG. 7 shows viscosity as a function of Carbopol® resin concentration in water. As shown, the viscosity of a medium (e.g., alcoholic gel) can be increased and controlled by adjusting the Carbopol concentration.

The reactor has far-reaching applications. Reactants such as PMPS and NaCl are quite stable when dry but once moisture is added and reactions are triggered, an agent with a completely different set of properties may be produced. The reactor allows for a stable point-of-use product with easy application. The fact that the reaction is triggered by moisture allows for a wide range of applications since the reactor remains stable until some type of liquid, such as water or urine, contacts the composition. The contaminated liquid that is to be treated is what activates the reactor to generate and release target products for treatment. When the released target products are oxidizers, they treat the bulk liquid by controlling bacteria, viruses and various organic and inorganic contaminants.

The benefits of the invention are broad in nature. The reactors, or the micro-reactors, provide storage stable, and safe to use bleaching agents and antimicrobial agents in a ready to use form. This technology greatly enhances the utility of the agents. For example, the agents can be combined with laundry detergents and provide one or multiple bleaching agents to provide a synergistic effect from a single or multiple reactors in the formulation. The micro-reactors can be impregnated into wipes whereupon contact with moisture, release powerful anti-microbial agents. Further still, the micro-reactors can be combined with other additives to provide for anti-microbial capabilities such as animal storage, feed, and cleaning facilities. Further still, the micro-reactors provide for convenient generation of anti-microbial agents for use in home and institutional applications as cleansers or diluted with water as a spray or aerosol. The micro-reactors also allow for applications where the products are suspended in a gel for easy application such as in medical or cleaning applications. Yet still, micro-reactors can generate multiple agents from one reactor, or be combined with multiple reactors each generating its own agent(s) to provide a combined effect to the bleaching or antimicrobial application.

One benefit of the invention is to control the reactor chemistry as to maximize the concentration of reactants in an environment conducive to forming the target products. For example, N-chlorosuccinimide generation is best performed under acidic conditions where chlorine gas and/or hypochlorous acid are readily available. In applications such as laundry bleaching, generation of N-chlorosuccinimide is less than optimal because the alkaline pH (generally >9.0) is not well suited for producing N-chlorosuccinimide. By producing N-chlorosuccinimide in a contained space inside the reactor and controlling the diffusion rate of product and reactants out of the reactor, the conditions that are conducive to high conversion rates and yields are sustained. Thus, the yield is maximized prior to the product's being releasing into the alkaline bleaching environment of the wash-water. Similar characteristics are true of the various oxidizers produced by reacting reagents to generate more powerful oxidants in-situ. Conditions such as pH, concentrations of reactants, and minimizing oxidizer demand such as that found in the bulk wash-water must be controlled to maximize conversion of the reactants and the yield of the target product. Utilizing granules of oxidizers incorporating precursors that require acid catalyzed reactions into alkaline wash water and high demand deplete in-situ efficacy.

The above description of the coating materials is not intended to limit the invention. In other chemical applications, such as where solvents are organic, a suitable coating may be selected to accomplish the desired effect while providing sufficient resistance to decomposition or dissipation prior to carrying out the function of a reactor. While the foregoing has been with reference to a particular embodiment of the invention, it will be appreciated by those skilled in the art that changes in this embodiment may be made without departing from the principles and spirit of the invention.

What is claimed is:

1. A solvent-activated reactor that generates a target product when placed in contact with a main solvent, the reactor comprising:
   a core that contains an intermixed first reactant and second reactant that are capable of at least partially dissolving in a main solvent to form liquid phase reactants that generate the target product by a chemical reaction upon being contacted by the main solvent; and
   a solvent-permeable reactor wall that uniformly encapsulates a core of reactants defining a reactor space that contains the core, wherein the solvent-permeable reactor wall in contact with the main solvent is a membrane which allows the main solvent into the reactor space, restricts the diffusion of the reactants out of the reactor space, wherein the target product diffuses out of the reactor space at a restricted rate through the reactor wall; and
   wherein the solvent-permeable reactor wall that uniformly encapsulates a core of reactants comprises:
   a coating material distributed over the surface of the core in the form of an aerosol or spray and dried; and
   wherein the coating material is selected from at least one of a; silicate, cellulose, chitin, chitosan, polymaleic acid, polyacrylic acid, polyacrylamide, and polyvinyl alcohol.

2. The solvent-activated reactor of claim 1, wherein the core is an aggregate of the first reactant and the second reactant.

3. The solvent-activated reactor of claim 1, wherein the first reactant is an oxidizing reactant constituting about 1-90 wt.% of the core, and the second reactant is an oxidizable reactant constituting about 10-50 wt.% of the core.

4. The solvent-activated reactor of claim 1, wherein the solvent-permeable reactor wall has a solubility in the main solvent that is substantially lower than that of the core such that the reaction space that is substantially sheltered from an environment surrounding the solvent-activated reactor.

5. The solvent-activated reactor of claim 1, wherein the solvent-permeable reactor wall disintegrates after substantially all of the generated target product diffuses out of the reactor space.

6. The solvent-activated reactor of claim 1, wherein the chemical reaction goes to completion in less than about eight hours.

7. The solvent-activated reactor of claim 1, wherein the chemical reaction goes to completion in less than about one hour.

8. The solvent-activated reactor of claim 1, wherein the solvent-permeable reactor wall forms a colloidal gel upon contacting the main solvent.

9. The solvent-activated reactor of claim 1, wherein the solvent-permeable reactor wall comprises a silicate.

10. The solvent-activated reactor of claim 9, wherein the silicate is water-soluble.

11. The solvent-activated reactor of claim 1, wherein the solvent-permeable reactor wall comprises a polymer.

12. The solvent-activated reactor of claim 1, wherein the solvent-permeable reactor wall comprises a cross-linking agent.

13. The solvent-activated reactor of claim 1, wherein the target product is selected from a group consisting of chlorine dioxide, percarboxylic acid, dioxirane, hypohalite, and N-halo-amide.

14. The solvent-activated reactor of claim 1 further comprising an environmentally protective coating positioned in contact with the solvent-permeable reactor wall.

15. The solvent-activated reactor of claim 14 wherein the environmentally protective coating comprises one or more of a polymer, polysaccharide, polysioxane, and silicate.

16. The solvent-activated reactor of claim 1, wherein the core further comprises one of mineral salts, silicates, and polysaccharides.

17. The solvent-activated reactor of claim 1, wherein the first reactant and the second reactant are in direct contact with each other.

18. The solvent-activated reactor of claim 1, wherein the target product diffuses out of the reactor space in a solution form.

19. A solvent-activated chlorine dioxide generator comprising:
   a core containing a mixture of metal chlorite, an acid source, and a free halogen source that dissolve in a main solvent to form liquid phase reactants and generate chlorine dioxide through an in-situ chemical reaction when contacted by the main solvent; and
   a solvent-permeable reactor wall that uniformly encapsulates a core of reactants defining a reactor space that contains the core, wherein the solvent-permeable reactor wall in contact with the main solvent is a membrane which allows the main solvent into the reactor space, restricts the diffusion of the reactants out of the reactor space, and where the liquid phase metal chlorite, acid source, and free halogen source generate chlorine dioxide, wherein the reactor wall releases the chlorine dioxide and a free halogen in the form of an oxidizing solution at a controlled rate; and
   wherein the solvent-permeable reactor wall that uniformly encapsulates a core or reactants comprises:
   a coating material distributed over the surface of the core in the form of an aerosol or spray and dried; and wherein the coating material is selected from at least one of a: silicate, cellulose, chitin, chitosan, polymaleic acid, polyacrylic acid, polyacrylamide, and polyvinyl alcohol.

20. The reactor of claim 19, wherein the reactor wall forms a colloidal gel upon contacting the main solvent.

21. The reactor of claim 19, wherein a free halogen concentration in the oxidizing solution is less than half of a chlorine dioxide concentration in the oxidizing solution on a weight basis, and wherein a ratio of the chlorine dioxide concentration to a sum of the chlorine dioxide concentration and chlorite anion concentration in the oxidizing solution is at least 0.25:1 by weight.

22. The reactor of claim 19, wherein a free halogen concentration in the oxidizing solution is less than ¼ of a chlorine dioxide concentration in the oxidizing solution on a weight basis, and wherein a ratio of the chlorine dioxide concentration to a sum of the chlorine dioxide concentration and a chlorite anion concentration in the oxidizing solution is a least 0.25:1 by weight.

23. The reactor of claim 19, wherein the a free halogen concentration in the oxidizing solution is less than ¹⁄₁₀ of a chlorine dioxide concentration in the oxidizing solution on a weight basis, and wherein a ratio of the chlorine dioxide concentration to a sum of chlorine dioxide concentration and chlorite anion concentration in the oxidirzing solution is at least 0.25:1 by weight.

24. The reactor of claim 19, wherein a ratio of a chlorine dioxide concentration to a sum of the chlorine dioxide concentration and chlorite anion concentration in the oxidizing solution is at least 0.6:1 by weight.

25. The reactor of claim 19, wherein a ratio of a chlorine dioxide concentration to a sum of the chlorine dioxide concentration and chlorite anion concentration in the oxidizing solution is at least 0.75:1 by weight.

26. The reactor of claim 19, wherein the core and the reactor wall are solvent-permeable in water.

27. The reactor of claim 19, wherein the reactor wall comprises a section that is not water-soluble.

28. The reactor of claim 19, wherein the metal chlorite contains one of: sodium chlorite, potassium chlorite, magnesium chlorite, and calcium chlorite.

29. The reactor of claim 19, wherein the acid source comprises sodium bisulfate.

30. The reactor of claim 19 further comprising magnesium chloride, calcium chloride, sodium chloride, and potassium chloride.

31. The reactor of claim 19, wherein the free halogen source comprises a material selected from the group consisting of: dichloroisocyanuric acid, a salt of dichloroisocyanuric acid, a hydrated salt of dichloroisocyanuric acid, trichlorocyanuric acid, a salt of hypochlorous acid, bromochlorodimethylhydantoin, and dibromodimethylhydantoin.

32. The reactor of claim 19, wherein the free halogen source comprises a sodium salt of dichloroisocyanuric acid.

33. The reactor of claim 19, wherein the free halogen source comprises a sodium salt of dichloroisocyanuric acid dihydrate.

34. The reactor of claim 19, wherein the metal chlorite is sodium chlorite, the core further comprising sodium bisulfate, calcium chloride, and a sodium salt of dichloroisocyanuric acid dihydrate.

35. The reactor of claim 19, wherein the metal chlorite is sodium chlorite, the core further comprising sodium bisulfate, magnesium chloride, and a sodium salt of dichloroisocyanuric acid dihydrate.

36. The reactor of claim 19, wherein the metal chlorite is sodium chlorite, the core further comprising sodium bisulfate, and a sodium salt of dichloroisocyanuric acid dihydrate.

37. The reactor of claim 19, wherein the acid source is a metal bisulfate, pyrosulfate, or phosphate.

38. The reactor of claim 19, wherein the acid source is potassium monopersulfate.

39. The reactor of claim 19, wherein the reactor wall comprises a silicate.

40. The reactor of claim 19, wherein the reactor wall comprises a polymer.

41. The reactor of claim 19, wherein the core further comprises a filler selected from a group consisting of mineral salts, clays, zeolites, silicates, and silica.

42. A solvent-activated chlorine dioxide generator comprising:
a core of reactants including a mixture of metal chlorite and an acid source that dissolve in water to form liquid phase reactants and generate chlorine dioxide through an in-situ chemical reaction when contacted by the water; and
a solvent-permeable reactor wall that uniformly encapsulates the core of reactants defining a reactor space that contains the core, wherein the solvent-permeable reactor wall is in contact with the water is a membrane which allows water into the reactor space, restricts the diffusion of the reactants out of the reactor space, and where the liquid phase reactants generate chlorine dioxide, wherein the reactor wall releases the chlorine dioxide into a surrounding environment at a controlled rate; and
wherein the solvent-permeable reactor wall that uniformly encapsulates a core of reactants comprises:
a coating material distributed over the surface of the core in the form of an aerosol or spray and dried; and
wherein the coating material is selected from at least one of a: silicate, cellulose, chitin, chitosan, polymaleic acid, polyacrylic acid, polyacrylamide, and polyvinyl alcohol.

43. The reader of claim 42, wherein the metal chlorite is sodium chlorite.

44. The reactor of claim 42, wherein the acid source is one of a metal bisulfate, a metal pyrosulfate, and a metal phosphate.

45. The reactor of claim 42, wherein the acid source is potassium monopersulfate.

46. The reactor of claim 42, wherein the acid source is sodium persulfate or potassium persulfate.

47. The reactor of claim 42, wherein the solvent-permeable coating comprises a silicate.

48. The reactor of claim 42, wherein the solvent-permeable reactor wall comprises a polymer.

49. The reactor of claim 42, wherein the core further comprises a filler selected from a group consisting of mineral salts, clays, zeolites, silicates, and silica.

50. A solvent-activated reactor that generates a target product when placed in contact with a main solvent, the reactor comprising:
a core that contains a dry aggregate of first reactant and second reactant wherein the first reactant and the second reactant are in direct contact with each other, the core being capable of generating the target product by a chemical reaction upon being contacted by the main solvent; and
a solvent-permeable reactor wall that uniformily encapsulates a core of reactants defining a reactor space that contains the core, wherein the solvent-permeable reactor wall in contact with the main solvent is a membrane which allows the main solvent into the reactor space, restricts the diffusion of the reactants out of the reactor space, wherein the target product diffuses out of the reactor space at a restricted rate through the reactor wall; and wherein the solvent-permeable reactor wall that uniformly encapsulates a core of reactants comprises:

a coating material distributed over the surface of the core in the form of an aerosol or spray and dried; and wherein the coating material is selected from at least one of a: silicate, cellulose, chitin, chitosan, polymaleic acid, polyacrylic acid, polyacrylamide, and polyvinyl alcohol.

51. A solvent-activated reactor that generates a target product when placed in contact with a main solvent, the reactor comprising:

a core that contains a reactant that is capable of generating the target product by a chemical reaction upon being contacted by the main solvent; and a solvent-permeable reactor wall that uniformly encapsulates a core of reactants defining a reactor space that contains the core, wherein the solvent-permeable reactor wall in contact with the main solvent is a membrane which allows the main solvent into the reactor space, restricts the diffusion of the reactants out of the reactor space, wherein the target product diffuses out of the reactor space at a restricted rate through the reactor wall; and wherein the solvent-permeable reactor wall that uniformly encapsulates a core of reactants comprises:

a coating material distributed over the surface of the core in the form of an aerosol or spray and dried; and wherein the coating material is selected from at least one of a: silicate, cellulose, chitin, chitosan, polymaleic acid, polyacrylic acid, polyacrylamide, and polyvinyl alcohol.

52. A solvent-activated reactor that generates a target product when placed in contact with a main solvent, the reactor comprising:

a core that contains a reactant that is capable of generating the target product by a chemical reaction upon being contacted by the main solvent; and a soluble reactor wall that uniformly encapsulates a core of reactants defining a reactor space that contains the core, wherein the soluble reactor wall in contact with the main solvent is a membrane which has a solubility in the main solvent that is lower than that of the reactant such that the soluble reactor wall allows the main solvent to enter the reactor space at a controlled rate, allows the target product to diffuse out of the reactor space at a controlled rate, disintegrates after the reactor space becomes substantially depleted of the reactant and the target product; and wherein the solvent-permeable reactor wall that uniformly encapsulates a core of reactants comprises:

a coating material distributed over the surface of the core in the form of an aerosol or spray and dried; and wherein the coating material is selected from at least one of a: silicate, cellulose, chitin, chitosan, polymaleic acid, polyacrylic acid, polyacrylamide, and polyvinyl alcohol.

* * * * *